US008806653B2

(12) United States Patent
Di Rienzo

(10) Patent No.: US 8,806,653 B2
(45) Date of Patent: Aug. 12, 2014

(54) LOCATION BASED SERVICE

(76) Inventor: Andrew L. Di Rienzo, Elizaville, NY (US)

( * ) Notice: Subject to any disclaimer, the term of this patent is extended or adjusted under 35 U.S.C. 154(b) by 670 days.

(21) Appl. No.: 11/196,836

(22) Filed: Aug. 3, 2005

(65) Prior Publication Data
US 2005/0268330 A1 Dec. 1, 2005

Related U.S. Application Data

(63) Continuation of application No. 09/560,784, filed on Apr. 28, 2000, now abandoned.

(60) Provisional application No. 60/133,492, filed on May 10, 1999.

(51) Int. Cl.
| H04L 21/00 | (2006.01) |
| G06F 21/32 | (2013.01) |
| G01S 19/14 | (2010.01) |
| G01S 5/14 | (2006.01) |
| H04L 29/06 | (2006.01) |
| G06F 21/31 | (2013.01) |
| G06F 21/34 | (2013.01) |

(52) U.S. Cl.
CPC ............ *H04L 63/0428* (2013.01); *G06F 21/32* (2013.01); *G01S 19/14* (2013.01); *G01S 5/14* (2013.01); *H04L 63/08* (2013.01); *G06F 21/31* (2013.01); *G06F 21/34* (2013.01); *H04L 29/06* (2013.01); *H04L 67/42* (2013.01)
USPC .................. 726/27; 726/3; 340/988; 713/182

(58) Field of Classification Search
CPC ........ H04W 4/02; H04W 64/00; H04L 67/18; H04L 67/22
USPC .......... 726/3, 27; 340/988–996; 713/182–186
See application file for complete search history.

(56) References Cited

U.S. PATENT DOCUMENTS 4,785,291 A * 11/1988 Hawthorne ................ 340/573.4
4,860,352 A    8/1989 Laurance et al. ............... 380/23
(Continued)

FOREIGN PATENT DOCUMENTS

WO    WO 98/57189    12/1998

OTHER PUBLICATIONS

Getting, Ivan., Perspective/Navigation: The Global Positioning System, Dec. 1993, Spectrum IEEE., vol. 30:12, 36-38, 43-47.*

*Primary Examiner* — Lisa Lewis
(74) *Attorney, Agent, or Firm* — Dicke, Billig & Czaja, PLLC

(57) ABSTRACT

In connection with authenticating a client of a network, information is acquired that characterizes the client in a manner that enables a determination about authenticating the client of the network, the information being acquired other than in the form of a digital message that is passed on behalf of the client to the network; an authentication decision is made based on the information.

Information is encrypted in a manner that is based on a physical property of an intended recipient of the information, and delivering the encrypted information to the recipient.

A source of a beacon is physically associated with a person, times of receipt of the beacon at multiple stations are measured, and the location of the person is determined based on the times of receipt.

A set of stations is established that are configured to acquire information that characterizes each of multiple clients in a manner that enables a determination about authenticating each of the clients with respect to a corresponding network, the information being acquired other than in the form of digital messages that are passed on behalf of the clients to the corresponding networks. The information is provided to operators of the networks to enable them to make authentication decisions based on the information.

47 Claims, 19 Drawing Sheets

(56) References Cited

U.S. PATENT DOCUMENTS

| | | |
|---|---|---|
| 5,327,144 A | 7/1994 | Stilp et al. ............ 342/387 |
| 5,422,814 A * | 6/1995 | Sprague et al. ............ 701/213 |
| 5,541,845 A | 7/1996 | Klein |
| 5,754,657 A | 5/1998 | Schipper et al. |
| 5,757,916 A | 5/1998 | MacDoran et al. ............ 380/25 |
| 5,777,580 A | 7/1998 | Janky et al. |
| 5,794,174 A | 8/1998 | Janky et al. |
| 5,838,277 A | 11/1998 | Loomis et al. |
| 6,100,806 A * | 8/2000 | Gaukel ............ 340/573.4 |
| 6,118,977 A | 9/2000 | Vannucci |
| 6,163,701 A | 12/2000 | Saleh et al. |
| 6,256,475 B1 | 7/2001 | Vannucci |
| 6,266,582 B1 * | 7/2001 | Bruckner ............ 701/4 |
| 6,281,837 B1 | 8/2001 | Richton et al. |
| 6,385,453 B1 * | 5/2002 | Foladare et al. ............ 455/445 |
| 6,438,380 B1 * | 8/2002 | Bi et al. ............ 455/456.1 |

* cited by examiner

Authentication System

Global Positioning System

LOCATION BASED SERVICE

Pursuant to 35 U.S.C. §120, this application is a continuation of and claims priority from U.S. patent application Ser. No. 09/560,784, filed Apr. 28, 2000, now abandoned which in turn claims priority from Provisional U.S. Patent Application Ser. No. 60/133,492, filed May 10, 1999. The contents of the prior applications are incorporated herein by reference in their entirety.

TECHNICAL FIELD

This invention relates to authentication.

BACKGROUND OF THE INVENTION

Consider a situation, such as described in FIG. 1, where a computer network (100) is formed from one or more remote clients [e.g., computers (101-103)] interacting over communication links (500-506) [e.g., telephone lines, hard wire, satellite links, IR, etc.] The Network wants authorized clients (e.g., 104) to gain access easily and unauthorized clients (e.g., 400) to be totally prevented from gaining access. [Note that this diagram is intended only to represent known elements of a computer network and its security system. In particular, it is intended to show the basic topology of these parts. Also, it is not intended to be an exhaustive example of current computer networks or their security systems. Consequently, items such as routers, firewalls, gateways and the like have not been explicitly displayed.]

The Authentication Process is the means by which the system stops unauthorized access to the Network. The Authentication Process constitutes the security measures protecting the Network. Typically, in the Prior Art, the Authentication Process is a multistep sequence based on User Credentials and the Network Authentication Server (200).

"User Credentials" are information, such as access codes and user ID's, that are assigned by the Network to all authorized users (i.e., people who have authorized access to the Network.) The Authentication Server is the part of the Network that reviews the credentials of a user when access is requested. Here the term "Authentication Server" is meant to represent whatever network hardware and software is used for this purpose.

The following is a typical Authentication Process sequence executed when a user wishes to gain access to the network, (See FIG. 2):

1) The user uses his client computer, and its specialized network software, to request access to the network.
2) The software prompts the user to enter his credentials into a certain location on a "Network LogOn" screen. This could include, for example, his user ID and access code (123, XYZ)
3) The client's Network software translates the credentials into digital information, i.e., a digital version of the user's credentials.
4) The client then creates an electronic message that includes the digitized credentials and transmits it to the Authentication Server. [Diagram 1 is meant to represent this electronic message.]

Diagram 1

| | 1 | 2 | 3 | X | Y | Z | | |

5) The Authentication Server converts the electronic message into digital information, i.e., a digital version of the user's credentials.
6) The Authentication Server has in its database a list of digitized credentials for all authorized users. When the electronic message from the client arrives, the Authentication Server takes the user's digitized credentials and compares these to the credentials it has stored in its database for this particular user. If they match, access to the network is granted to the user. If they don't match [e.g., (123, XZZ)] then access is denied.

Unauthorized users can gain access to the Network by defeating the security measures, i.e., the Authentication Process. The source of this problem is that current Authentication Processes are based on analyzing digital information sent from the client to the Authentication Server. It is only the electronic signal itself that is analyzed. Security is based on analysis of this signal. Neither the physical client, nor its human operator, is analyzed directly. This same problem exists for all credentials data as long as the Authentication Process remains the same.

Computer hackers break through this type of security just by mimicking valid digital credentials in the electronic message (See Diagram 1) sent to the Authentication Server by the client. This only requires a computer (client), a communication link, and a valid set of credentials. The first two are readily available and the last can be obtained by a variety of means such as: guess work, simple theft, etc. That is, the hurdles (technological, financial, etc.) to unauthorized entry are fairly low.

The electronic message containing the credentials does not come with any indelible indicators of the actual person or client who has sent it because it is just a series of computer generated electronic impulses and is therefore susceptible to hackers.

To illustrate this point, consider the following analogy:

Imagine a situation where physical access to a building is protected by an "Authentication Process" based on analysis of a person's handwriting. And the actual process only requires that a person wishing to access the building give the guard a piece of paper with handwriting on it. The handwriting is compared to that on file for the name that was given. If they match, the person is emitted.

But a sample of the handwriting could be stolen or forged, thus allowing an unauthorized person admission to the building. Here, as in the computer network case, it was information supposedly about the person that was analyzed. It was not the person themselves, or even information known to have come from the person, that is analyzed.

The above network Authentication Process is based on traditional User Credentials. It could be argued that more modem credentials exist. These would include client CPU Chips with ID's (such as the Pentium III with Processor Serial Number from Intel) and User Biometrics (such as thumb prints, facial scans, etc. which are used, for example, by the BioNetrix Systems Corporation of Vienna, Va., USA) But these modem credentials, although useful, are still employed in the same type of authentication process. And therefore, the network is susceptible to the same type of unauthorized user, i.e., the hacker.

To see this, consider the employment of the user's thumbprint as a means of authenticating a network user. In this case, the user's client has a special scanner connected to it. The Authentication Process would be a sequence similar to the following (See FIG. 3):

1) The user uses his client computer, and its Network software, to request access to the Network.
2a) The client software prompts the user to enter his credentials into a certain location on a "Network LogOn" screen. This could include, for example, his user ID and access code: (123, XYZ)
2b) Thumb Print Scan
    The client's software also prompts the user to place his thumb on the scanner. The client then scans the thumb. Scanning "digitizes" an image of the thumbprint. That is, it turns the physical thumb print into a set of pixels containing digital information that characterize the thumbprint.
3) The client's software translates the credentials into digital information.
4) The client then creates an electronic message that includes the digitized credentials and the digital thumb print. The client then transmits these to the Authentication Server. [Diagram 2 is meant to represent this electronic message.]

---
Diagram 2
---

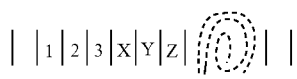

5) The Authentication Server receives the electronic message and translates it back to digital information.
6) The Authentication Server has in its database a list of digitized credentials and digitized thumbprints for all authorized users. When the electronic message from the client arrives, the Authentication Server takes the user's digitized credentials and thumb print and compares these to the credentials and thumb prints it has stored in its database for this particular user. If they match, access to the network is granted to the user. If they don't match then access is denied.

Note that not only is the actual thumb not being analyzed, but neither is a physical thumbprint (such as on a law enforcement finger print card) being analyzed. Rather it is only the digitized version of the thumbprint created by the client that is analyzed. And this gives a hacker a way of breaking into the system. For example, if he were to obtain a copy of a user's thumbprint, he could digitize it and then use that digital version to send to the Authentication Server when the request came for the thumbprint.

Therefore, the three types of authentication data:
    User Credentials
    User Biometrics
    Client Branding
all suffer from the same problem. They are all turned into digital messages by the client. This "client formed digital message" is then analyzed in the Authentication Process. And it is the nature of a "client formed digital message" that it can be hacked with readily available, and inexpensive, technology. In addition, the skills needed to overcome this type of security system are within the expertise of the traditional hacker.

Finally, it should be pointed out that one of the additional weaknesses of this type of authentication process is that when a Network decides to make its authentication process more difficult for the hacker to break through, it also becomes more of an irritant for the legitimate user to access the Network. The Process is non-transparent to the legitimate user.

In summation, current authentication processes are based on having the user's client take user credentials, form them into a digital message and then transmit this message to the Network Authentication Server where it is this digital message that is analyzed. This approach has several weaknesses and deficiencies that include the following:
1. it relies on data digitized and transmitted by the user's client.
2. it analyzes digital representations of information about the client/user and not the client/user themselves. [For example, it analyzes a digital representation of a thumbprint and not a thumb print itself, let alone a thumb.]
3. it presents a low hurdle, both in expense and technical skills necessary, to an unauthorized user.
4. it is an irritant to the legitimate user (i.e., it is non-transparent)
5. it can be overcome by traditional hacking, i.e., software and readily available computer and telecommunications technology.

Finally, the enormity of the computer network security problem cannot be over estimated. Computers are pervasive in our society. The national defense itself is tied inseparably to them. Unauthorized access to critical mission computers (e.g. those controlling the Ballistic Missile System) could jeopardize our national existence.

There is a need for an authentication process which will uniquely identify the originator of a network access request and which includes the following:
1. it doesn't just rely on messages created by the requesting client
2. it analyzes information empirically obtained about the client, not just information sent from the client.
3. it raises the hurdles, in both expense and technical skills needed, to gain unauthorized access to the system
4. it is transparent to the legitimate user
5. it cannot be overcome by hacking

SUMMARY OF THE INVENTION

In general, in one aspect, the invention features, in connection with authenticating a client of a network, acquiring information that characterizes the client in a manner that enables a determination about authenticating the client of the network, the information being acquired other than in the form of a digital message that is passed on behalf of the client to the network, and making an authentication decision based on the information.

In general, in another aspect, the invention features encrypting information in a manner that is based on a physical property of an intended recipient of the information, and delivering the encrypted information to the recipient.

In general, in another aspect, the invention features physically associating a source of a beacon with a person, measuring times of receipt of the beacon at multiple stations, and determining the location of the person based on the times of receipt.

In general, in another aspect, the invention features establishing a set of stations that are configured to acquire information that characterizes each of multiple clients in a manner that enables a determination about authenticating each of the clients with respect to a corresponding network, the information being acquired other than in the form of digital messages that are passed on behalf of the clients to the corresponding networks, and providing the information to operators of the networks to enable them to make authentication decisions based on the information.

In general, in another aspect, the invention features encrypting and decrypting a message by expressing the message as a message signal comprised of a sum based on eigenfunctions. The message is decomposed into partial sums such that each of the partial sums conveys no meaning relative to the message. Electromagnetic signals are formed based on the respective partial sums. The electromagnetic signals are sent from respective sources at times selected to assure the simultaneous arrival of the signals at an intended location, such that the electromagnetic signals superpose themselves to form the message signal.

The invention relates to a system and method that uses:
1. data empirically gathered about the user/client, by the network itself, as the basis for the authentication process instead of the traditional client generated digital message, and
2. message encryption with decryption based on an inherent physical property of the user/client as one aspect of the security system.

In another aspect, the invention relates to a system and method that changes how a computer system interacts with a client from one where the client sends certain data to the system to one where the system obtains certain data empirically. This second invention is independent of:
computer network security systems
the quantity that is being empirically measured
the technique used to measure it
the "message encryption based on an inherent physical property" technique.

In general, in another aspect, the invention features a system and method for sending coded information from one entity to another such that the method of encoding the information is specifically chosen so that it is decoded by an inherent physical property of the recipient. This third invention is independent of all of the following: computer network security systems, the particular inherent physical property of the recipient that is being used, the particular method of encoding the information, and of the empirically gathered data concept.

The last two aspects of the invention are independent of computer security systems and can be applied in a large variety of areas.

In implementations of the invention, computer hardware, software, telecommunications hardware and software, empirical data gathering devices, and a method of operating these create a computer network authentication process (i.e., a computer network security system) which is based on analysis of empirical data obtained directly by the network itself about the user/client requesting access and which is not based solely on analysis of digital messages created by the requesting client.

Implementations of the invention empirically obtain user/client information and then include this information as part of a computer network authentication process.

It is important to note that it isn't just different "credentials data" that the invention's Authentication Process is based on. Rather, the invention's Authentication Process itself is different. In particular, it includes a different method of obtaining data about the client from that used in the Prior Art's authentication process. An example of this method would be to employ Remote Sensing techniques to gather the required data.

Implementations of the invention also empirically obtain information about a subordinate. This inventive concept is independent of computer network security and can be applied in a wide variety of areas (e.g., the location of a particular individual or object by some authority not related to access to a computer system.)

In examples of the invention, precise physical location of the clients is used as a means of identifying authorized users of a closed computer network. [There are many other physical observables that could be used.] The location is determined by means that are not "hackable." Specifically, the client doesn't tell the Authentication Server where it is (i.e., it does not transmit a digital message saying "I am at location X Longitude Y Latitude.") Rather, the invention acts to make direct measurements of the client's position. Many methods of Remote Sensing can be employed for this purpose. One particular method of doing this is by measuring time of reception of a radio beacon signal from the client.

Other aspects of the invention provide:
i) a novel System and method for encrypting and decrypting messages
ii) use of this encryption/decryption method as part of the authentication process for a computer network security system.

i) In this approach to encryption/decryption there are basically three levels.
a. The concept of encoding a message based on some inherent physical property of the recipient.
b. The particular physical quantity used
c. The particular method used with the chosen property to encode the information.

Information can be encrypted in a special way, such that, a specific, and unique, physical property of the recipient automatically decrypts the information. There are many physical properties this could be based on, for example:
a. physical location
b. unique sensitivity to light or sound
c. DNA (unique to each individual)

For each unique physical property, there will be many ways to encrypt the information such that when it arrives it is automatically decoded by the physical property itself of the authentic recipient.

ii) Messages to the user/client are encrypted in such a way that certain inherent physical properties of the user/client itself (in particular those mentioned above that are empirically measured as part of the authentication process) are used as "keys" that automatically decrypt the messages. In other words, if the user/client is who he says he is, then the message will arrive in-the-clear.

For example, the client's stated physical location is used as a means to decrypt messages from the Authentication Server. This message is then used as part of the Authentication Process.

This works in the following way: An encryption method is created whereby a message, in the form of an electromagnetic signal, is decomposed into several parts. These parts are individually unintelligible. Then the different parts are transmitted at different retarded times and from different locations (e.g. satellites, microwave towers, etc.) such that they recombine (superpose) at some specified time and are intelligible in-the-clear at only one physical location. That is, they are understandable without analysis only at the authorized client's position. Finally, the response of the client to the message is noted and used as part of the Authentication Process.

Client Response Time may be Used for Authentication. A message is sent from the authentication server to the requesting client which orders the client to take a particular action. The response time of the client is measured and used as part of the authentication process.

The invention ties each authorized user to a particular authorized client.

The novel aspects of the invention's Authentication Process are totally transparent to the authorized user. That is, its novel aspects require no additional work for the legitimate user.

The invention creates an interactive method of computer network security

The invention includes spoofing counter-measures. That is, it is flexible enough to allow for changes in the Authentication Process.

The invention changes the dynamics between the network and the unauthorized user. The invention gives network administrators an entirely new dimension in which to pursue security. Clever network administrators will find additional ways to employ the basic concepts of the invention to thwart unauthorized users.

The invention raises the hurdle to gain unauthorized access to a network. It does this by redefining the dynamics of the hacker/authentication server battle. That is, it forces the unauthorized user to do things (e.g., finding satellite positions, radio transmissions, electromagnetic pulse generation, signal analysis, telephone fraud measure, etc.) that are not just clever uses of software. These are things that require large financial resources and access to many technologies: things that the traditional hackers do not have.

Among the benefits achieved by the invention may be one or more of the following:
1. Make computer networks more secure.
2. Create a network security system that doesn't just rely solely on the analysis of digital messages sent from the client to the authentication server for the authentication process.
3. Create a network security system whereby the computer network itself empirically gathers information about the client/user and then incorporates this information into the authentication process.
4. Raise the hurdles to unauthorized access so as to essentially eliminate the traditional hackers from the ranks of potential unauthorized users. That is, only extremely well funded and technologically sophisticated organizations have any possibility of overcoming the hurdles and gaining unauthorized access to a Network. (See Appendix A)
5. Make the novel security measures of its Authentication Process transparent to the authorized users.
6. Change the dynamics between the Network and the unauthorized user.

The invention creates an authentication process that gives the network administrator an entire new class of authentication methods and data to use, using an authentication process that can't be fooled by traditional hacking techniques.

The invention gives network administrators an entirely new dimension in which to pursue security. In doing so it changes the dynamics between the network and the unauthorized user. This alone adds to the level of security for the Network. Clever network administrators will find additional ways to employ the basic concepts of the invention to thwart unauthorized users.

7. Use the concept of "empirically gathered data about a subordinate" in areas outside computer network security. These could be in areas such as: a system that can physically locate a teenager who is away from home or location of patients who could become incapacitated.
8. Use the concept of "encryption with decryption based on a physical property of the recipient" in areas other than computer network security.

In some implementations of the invention these and other benefits are provided by a combination including: A computer network with an authentication server, one or more remote clients, several software packages, routers, firewalls, and communication links. The clients have monitors, keyboards, CPUs, memory, antennas, radio transmitters, and a means to convert a digital signal from the CPU into a command to a radio transmitter. Also included in the invention is an empirical data-gathering device such as a satellite. This device is equipped with an antenna for transmission and reception of radio or other Electromagnetic (EM) radiation. It also has software that includes, but is not limited to, packages that receive and send messages to clients and that receive and send messages to the Authentication Server.

BRIEF DESCRIPTION OF THE DRAWINGS

Implementations of the Invention are described with reference to the drawings in which like elements are denoted by like or similar numbers and in which:

FIG. 10A is a high level diagram showing how a signal f (t, $P_A$) might be modified by using only a finite number of eigenfunctions and still be acceptable for our purposes.

DETAILED DESCRIPTION OF THE INVENTION

The present invention provides an improved system and method for authenticating clients and/or users as they request access to computer network systems. Generally described, the invention's authentication process is based on analysis of empirical data obtained directly by the network about the client and/or user and is not solely based on analysis of digital messages created by the client.

The invention uses data that the network itself empirically obtains about the client/user as the basis of the authentication process. There are many physical quantities that could be used to authenticate a client/user (e.g., physical location, emission spectra in various electromagnetic wavelength regions, internal clock phasing with respect to a network master clock, biometrics of the user, etc.) And, for each of these, there are many methods by which to obtain empirical data about that physical quantity (e.g., satellites equipped with Remote Sensing devices, ground based equipment, etc.) A variety of physical quantities and methods of empirically measuring them by the Network may be used to implement the invention.

An example of the invention will be described that is based on physical location of the client as the quantity to be empirically measured and which uses satellites to measure this quantity.

Figure 1:
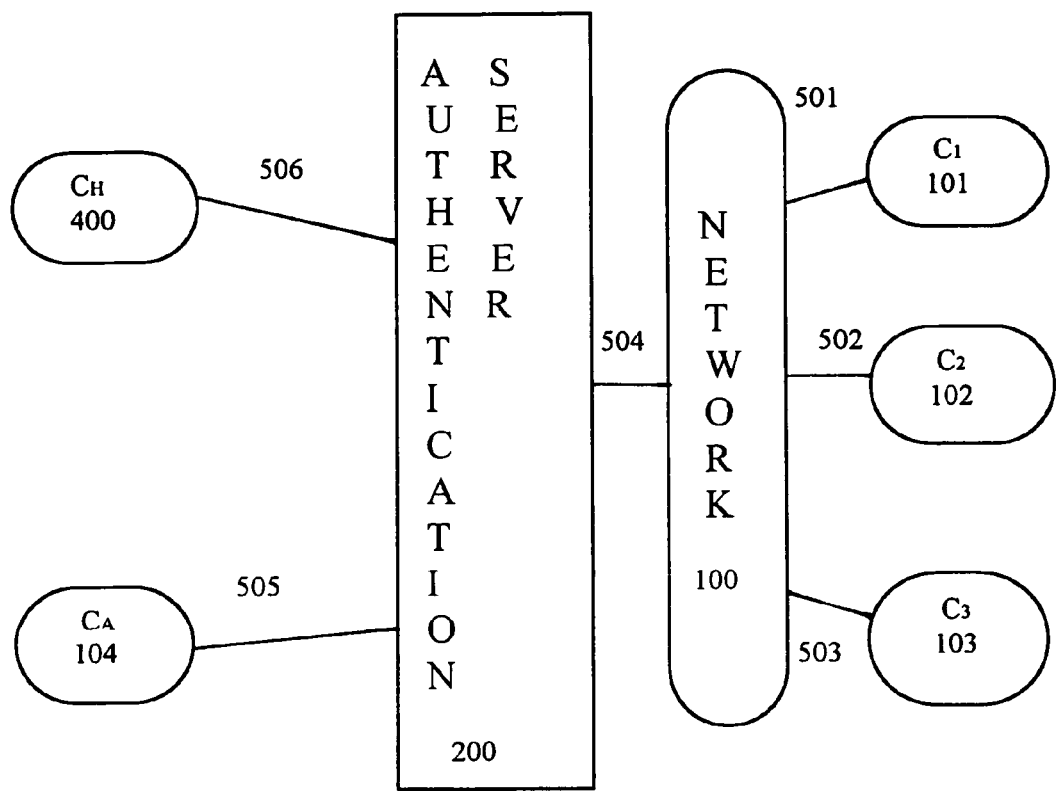
FIG. 1 is a high-level block diagram that is useful in understanding the topology of a computer network and its security system in the Prior Art.
Figure 2:
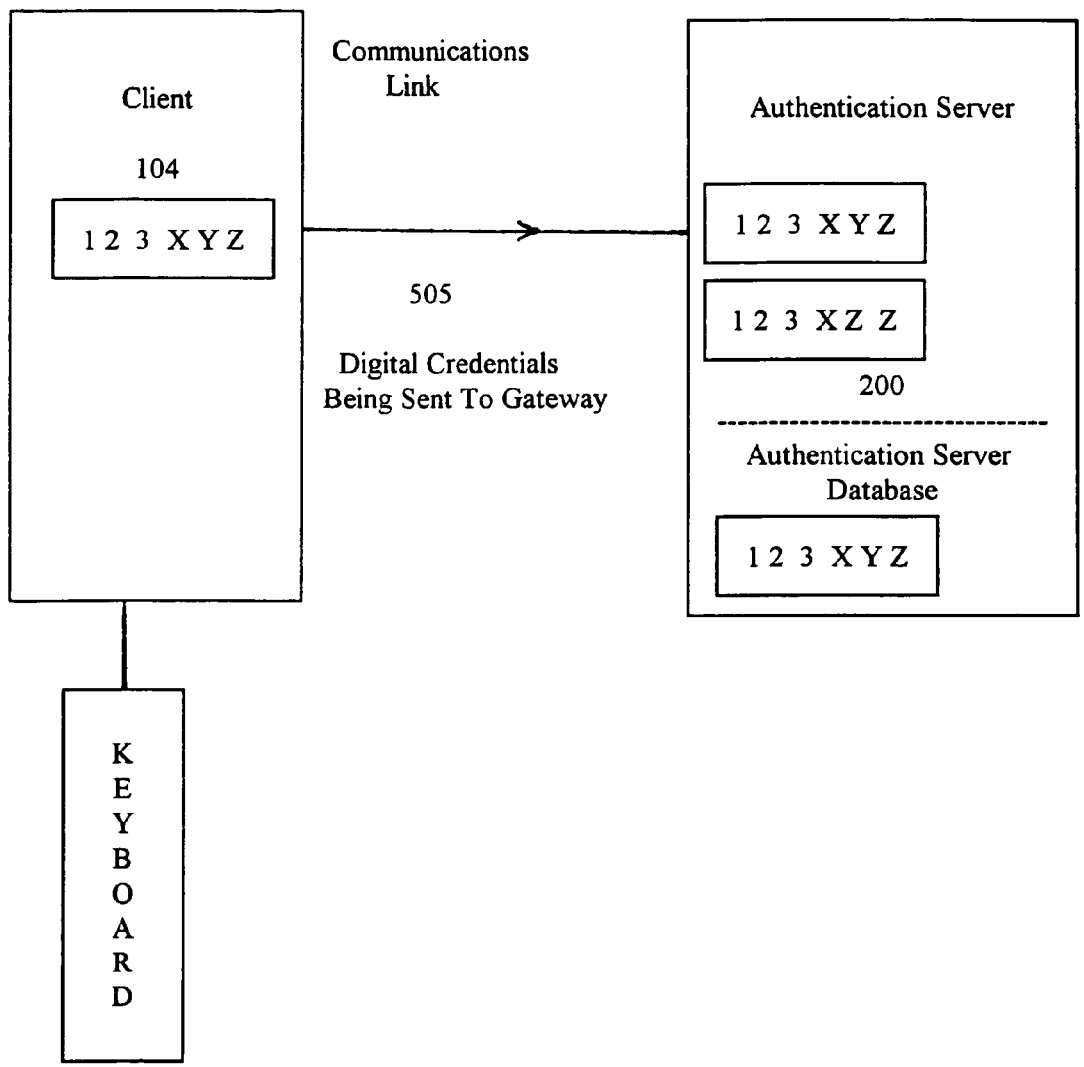
FIG. 2 is a combination high-level block diagram and flow diagram that is useful in understanding the operation and attendant problems of the Prior Art for network security.
Figure 3:
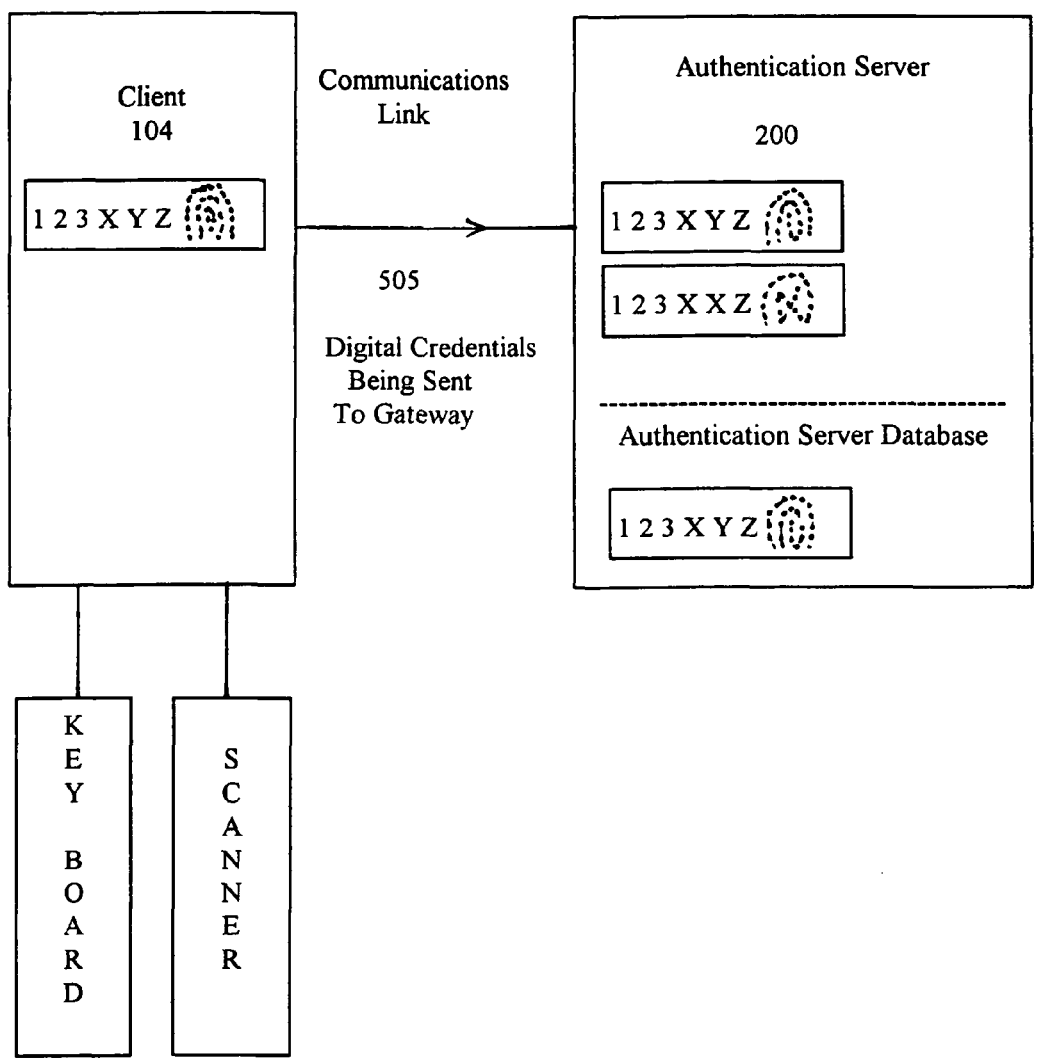
FIG. 3 is a combination high-level block diagram and flow diagram that is useful in understanding the operation and attendant problems of the Prior Art for network security when biometric data is included in the authentication process.
Figure 4:
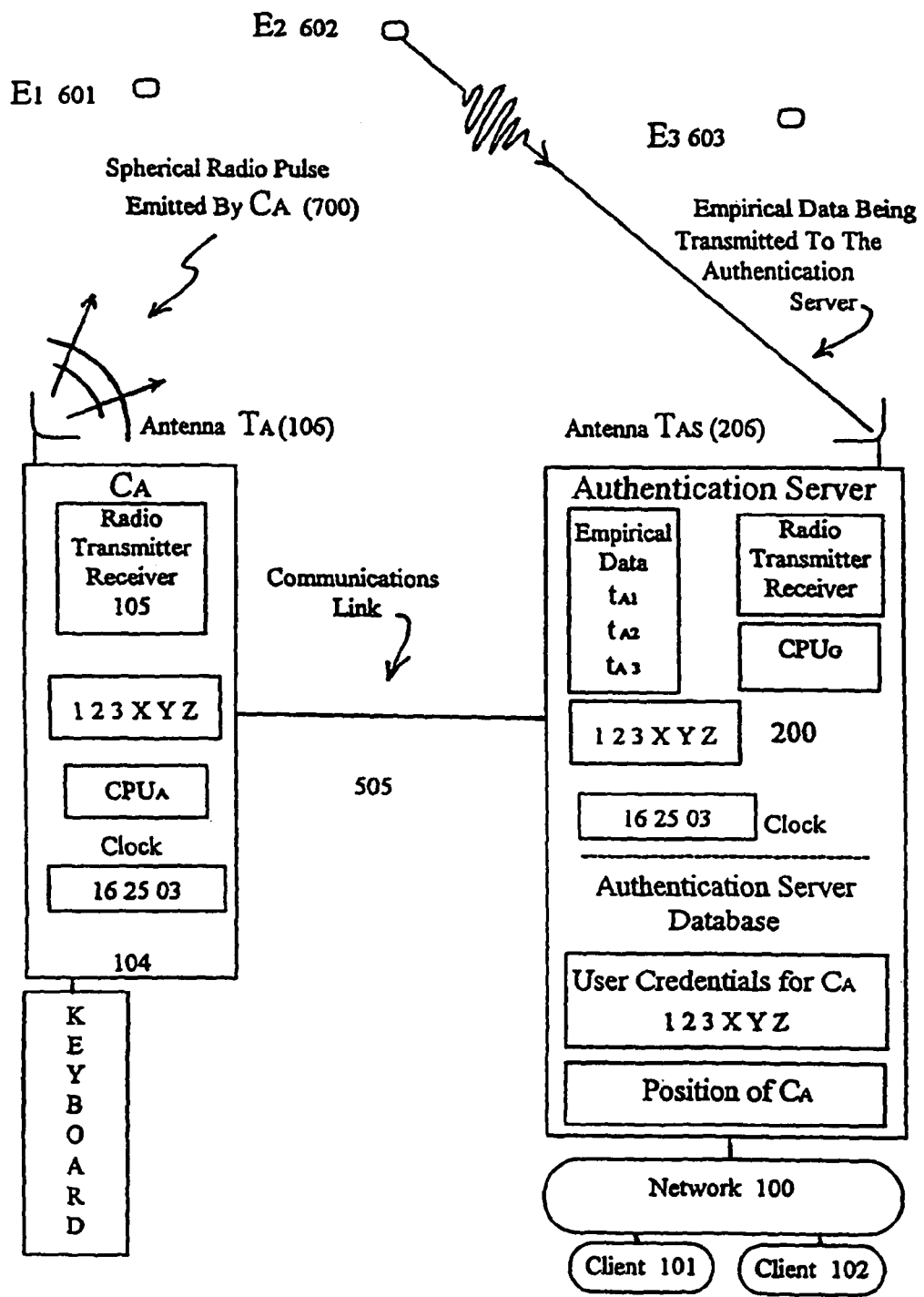
FIG. 4 is a combination high-level block diagram and flow diagram that is useful in understanding the operation and system of the computer network security Authentication Process according to a preferred embodiment of the present invention.

The example will now be described with reference to FIG. 4. In particular, as shown in FIG. 4, the overall system according to the present invention includes: A computer network including an Authentication Server (200), one or more remote clients (104), and a communication link (505). The clients have monitors, keyboards CPUs, memory (RAM and hard disk drive), a means to convert a digital signal from the CPU into a command to a radio transmitter/receiver (105), and a radio antenna (106). Also included are empirical data gathering devices such as satellites (601-603) [or, for example, microwave antennas, cellular phone infrastructure, etc.] These are equipped with antennas for reception of radio or other electromagnetic radiation, computer hardware and software to receive and send messages to clients, and to receive and send messages to the Authentication Server. [Note that it is also assumed that any other standard computer network hardware and software (such as routers, firewalls, gateways, etc.) is included.]

In FIG. 4:
AS—Authentication Server
$C_A$—An authentic client trying to access the system
$CPU_A$—Central Processing Unit of Client A
$R_A$—Radio Transmitter/Receiver
$T_A$—Antenna
Ei—Satellite (i=1, 2, 3)

Beacon Signal Method

Assume that this is a "closed" computer network and that the network has "control" over the remote client computers.

In this specific embodiment the word "closed" means that the network limits access to specific client machines. [In other embodiments, this limitation could be removed.] These clients have hardware/software configurations that the network itself can determine. So, for example, a user cannot just take the Network access software and install it on any PC to gain access. The Network, therefore, is different from the traditional ISP such as America On Line.

The word "control" means that the network can dictate certain issues. For example:
It can configure the hardware and software that is on the client. Such as, it could require:
  i) the use of a Branded CPU such as the Pentium III with Processor Serial Number from Intel
  ii) the installation of PC Anywhere or similar software that will allow the network manager to take control of the client.
  iii) the placement of client specific information into hidden Nonvolatile Read Only Memory (ROM) of the client. (This could be done in a similar fashion to how BIOS/Flash information is handled. This information could include for example: a variety of different commands, a random list of signature pulse signals, etc.)
  iv) the installation of a highly accurate clock which is synchronized with a central network clock. [Similar to those used by the Global Positioning System (GPS).]
  v) a radio transmitter and antenna to be connected to the client.
It can demand that each user be restricted to a specific client. (This coordinates User Credentials with physical location of the client.)
It can demand that clients not be physically moved without authorization from the network.
It can demand that a client go through an initialization process.
When a new user is brought onto the network, an official from the network administration could go to the physical location of the authentic user and install the client. He could then do any number of things, such as:
  execute trial runs to see what the client's response time is to an order from either the Authentication Server or the satellites to transmit a specific message,
  having the client/Authentication Server linked through PC Anywhere such that the commands to the client are being given directly by the Authentication Server
  using a Global Positioning System (GPS) device to get the precise location of the client.

Electronically connected to each client's CPU is a radio signal transmitter/receiver. Within the network, each client is assigned a specific electromagnetic pulse form [or a random sequence of such forms hidden in Nonvolatile Read Only Memory (ROM)] that is only used by that particular client. There are also at least three satellites that are within the control of the Network. The primary function of these satellites is to gather empirical data about the clients and to transmit this data to the Authentication Server. In addition, these satellites could also be used to send and receive information from the Authentication Server and to send and receive information from the clients.

While not required in all implementations, these features and hardware allow the Network in this example to institute a novel security system for network access. This security system will now be described in terms of the steps of an Authentication Process.

1) The user uses his client computer, $C_A$ (104), and its software to request access to the Network (200). This client, which is configured by the Network, has specific hardware and software pre-loaded on it related to the Authentication Process.
2) When the client's Network software is opened, it prompts the user to enter his User Credentials into a certain location on a "Network LogOn" screen. This could include, for example, his user ID and access code: (123, XYZ). It could also contain, for example, biometric information, Processor Serial Number, encryption keys (public/private), etc.
3) The client's software translates the credentials into digital information.
4) Data is transmitted to the Authentication Server; Empirical Data is obtained
    a) The client's software then creates an electronic message that includes the digitized credentials (as shown in Diagram 3).

---
Diagram 3
---
| | 1 | 2 | 3 | X | Y | Z | | |

Figure 5:
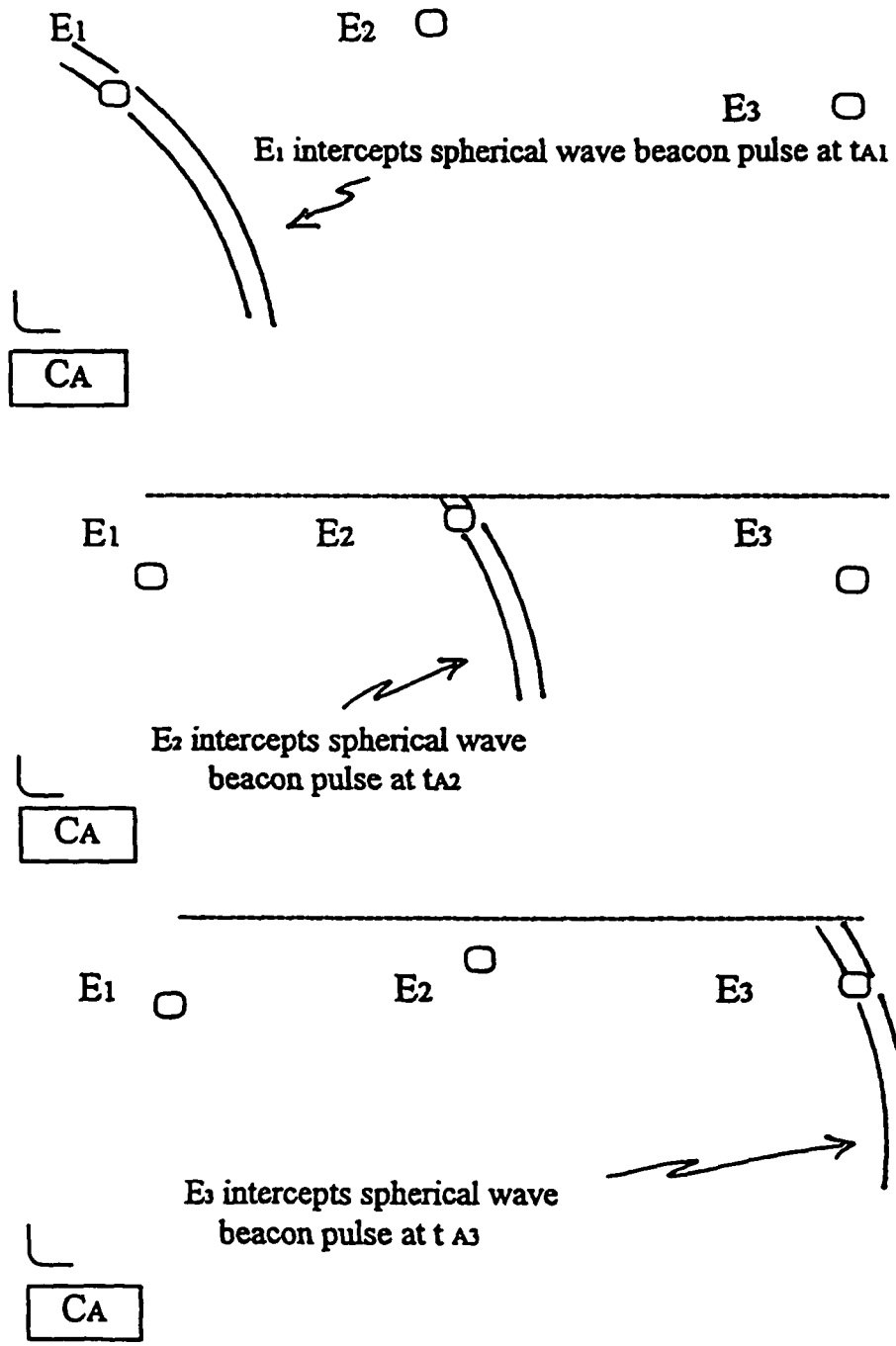
FIG. 5 is a high-level block diagram showing how different satellites intercept a client beacon at different times.

When the "Connect" button on the Graphic User Interface (GUI) screen is clicked the software forces two events to occur:
    i) the above electronic message is transmitted to the Authentication Server via the normal communications link (505).
    ii) the software orders the radio transmitter $R_A$ (105) to emit the beacon signal (700) from the antenna $T_A$ (106) with the pulse signature that has been assigned to this particular client.
    b) Empirical Data on Client's Physical Location is Obtained
    The act of transmitting the credentials to the Network triggers a radio beacon signal to be emitted from the client. (The user doesn't have to do anything additional to have this beacon emitted.) This beacon signal is typically a spherical (i.e., omnidirectional) EM wave with a unique pulse shape.
    The radio signal is detected by the satellites Ei (600). The satellites note the client's signature pulse and the time of reception, $t_{A1}$, $t_{A2}$, and $t_{A3}$ of the pulse. The arrival times will, in general, be different for the three different satellites. (See FIG. 5) The results of these measurements are transmitted to the Authentication Server. [Note that in other embodiments there will be other quantities measured, such as: direction of the EM beam, polarization, etc.]
    It is important to note that the present invention differs from the Prior Art at this point in two fundamental ways:
        i. the authentication data is different from the prior art.
        ii. the method for obtaining that data is active (empirical) rather then passive.
5) Checking for Authenticity: A Two Step Process
    a) The Authentication Server has in its database a list of digitized credentials for all authorized users. When the electronic message from the client arrives via the normal communications link (505), the Authentication Server takes the user's digitized credentials and compares these to the credentials it has stored in its database for this particular user.
    b) Using Empirical Position Data To Determine Authenticity
        i) The Authentication Server also has in its database the physical location of each authorized client. (This can be obtained, for example, in an unequivocal manner by having a Network Official use a Global Positioning System (GPS) device during the initialization process. Once this physical position is established, movement of the user's client is restricted to a certain physical region established by the Network.)
        ii) The Authentication Server receives information from the satellites on their direct measurement of the clients beacon signal, i.e., $t_{A1}$, $t_{A2}$, and $t_{A3}$.
        iii) The Authentication Server uses beacon signal information to calculate the location of the client. (See Below)
        iv) It then compares the actual position against the registered one.
    c) Both the User Credentials in (a) and the physical location in (b) must match the information stored in the Authentication Server's database for access to be given. If either, or both, of these quantities do not match those in the database, then access is denied.

Note that the radio signal is a beacon not a message. That is, it does not tell the satellites the location of the client (e.g., it is not a message that says "the client is at 77° 03' 56" West Longitude and 38° 55' 14" North Latitude".) Rather, the client's CPU orders the radio transmitter to emit a spherical wave with the client's signature pulse. This is detected by the satellites and certain empirical data about the signal is recorded. The empirical data could include, but is not limited to: time of arrival, pulse shape, polarization of the wave, etc. This empirical data is then sent to the Authentication Server. By analyzing this data the Authentication Server calculates the position of the radio emitter.

Figure 6:
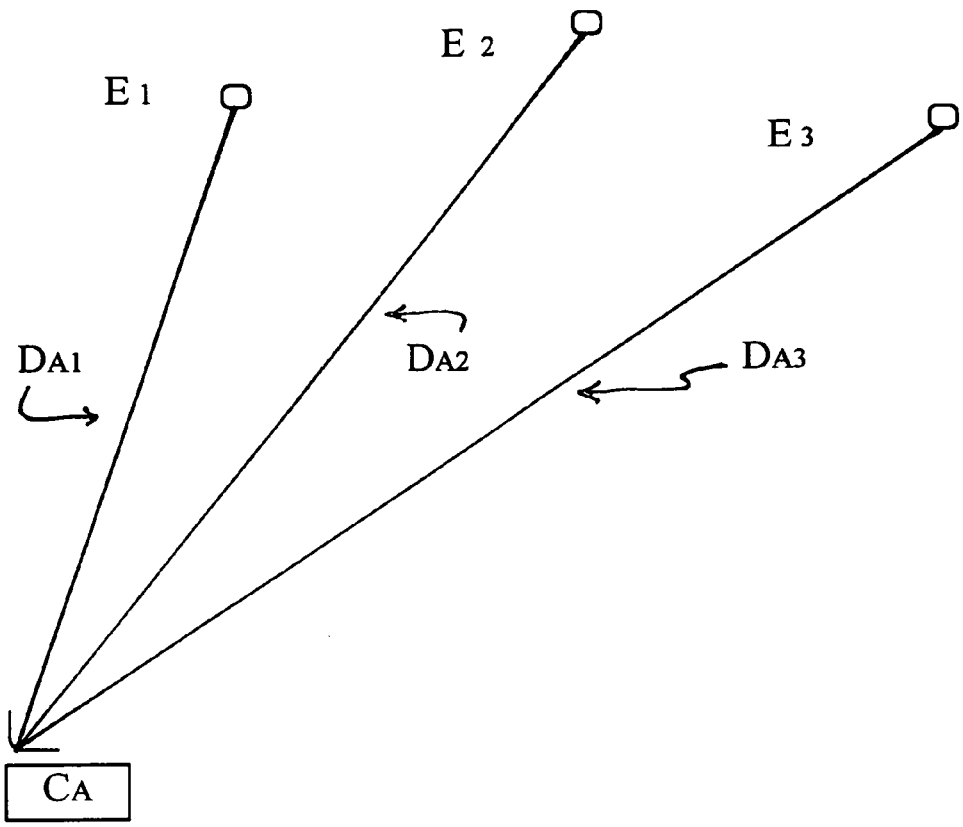
FIG. 6 is a block diagram showing the distances $D_{Ai}$ from each satellite to the requesting client $C_A$.

Calculation of Position
(See FIG. 6)

The Network Administration knows the position of all authorized clients and their radio antennas.

It also knows the positions of the three satellites. It therefore can calculate the distances $D_{A1}$, $D_{A2}$, and $D_{A3}$ from the client $C_A$ to each of the satellites at any given time.

Consider the situation where the client seeking access has emitted a single beacon signal at time $t_{Ae}$ and this has been detected by the three satellites at times $t_{A1}$, $t_{A2}$, and $t_{A3}$. (In this embodiment, it is these times that are the empirically measured quantities.)

The goal of the system is to confirm the physical location of the client. If the distances $D_{A1}$, $D_{A2}$, and $D_{A3}$ were known this would give us the position. That is, knowing these distances would given us three simultaneous quadratic equations with three unknowns. (These are spheres composed of the points that the signal could have come from.) These equations can be solved to give the position of the client's antenna. In essence, the solution is the point where the three spheres intersect.

The issue then is to calculate the distances $D_{A1}$, $D_{A2}$, and $D_{A3}$ from the empirical data $t_{A1}$, $t_{A2}$, and $t_{A3}$. There are several ways to do that. A specific example will now be given.

Consider the situation where the Network has electronically configured a very sensitive clock that is synchronized with a central Network clock on all authorized clients. [Sensitive clocks of this type are already being used by the Global Positioning System (GPS).] This clock ticks off "time segments" of some specified length (e.g. five seconds). These "time segments" are further broken down into smaller elements (e.g., milliseconds.) Each authorized client is assigned a beacon signature pulse form and a specific element within each "time segment" during which to transmit its beacon pulse. For example, client $C_A$ could be allowed to emit (transmit) its beacon at the 50 millisecond mark from the beginning of a "time segment." This time is labeled as $t_{Ae}$.

The Network has a highly accurate clock that all the client clocks are synchronized with. Therefore, the Authentication Server knows precisely when every "time segment" starts and what the assigned $t_{Ae}$ is for each client. So that when it receives the empirically measured times $t_{A1}$, $t_{A2}$, and $t_{A3}$ it knows the transition times, $(t_{Ai}-t_{Ae})$, of the pulses from the client to each of the three satellites. This then allows it to calculate the distances from $$D_{Ai}=c(t_{Ai}-t_{Ae}) \quad \text{[Equation 1]}$$

c=speed of light
i=1, 2, 3
$t_{Ae}$=time signal is emitted by $C_A$
$t_{Ai}$=time signal is received by $E_i$

[Note that the "time segment" has been chosen to be large enough so that the signal from every client can reach the satellites before the next "time segment" begins.]

We know that there is only one spot on the earth that has the same set of distances $D_{A1}$, $D_{A2}$, and $D_{A3}$. Once we calculate these, we can compare them to the known physical distances that have been stored in the database of the Authentication Server for the authorized client $C_A$.

Almost any degree of accuracy in position determination is possible. The primary limitation is cost. But whatever method and accuracy is chosen, there will always be a "cell" within which the client must stay in order to satisfy the criterion of the Authentication Process. As we will see, the smaller this cell is the harder it will be for an unauthorized user to gain access to the network.

The invention achieves several benefits compared to the prior art, namely:
1. The invention uses information empirically gathered on the client by the Network itself as a key basis of its authentication process.
2. The invention analyzes empirical data on the users and/or clients themselves (e.g. electromagnetic radiation.)
3. The invention raises the hurdles by requiring an unauthorized user who is trying to gain access to the Network to not only possess hacking skills, but also to overcome the empirical data gathering system. (In some implementations this is the "location determining system.") This is expensive and requires skills that are not in the traditional hacker's repertoire. It also means that he must have particular information not only about the user but also about the user's assigned client (e.g., he must know the signature pulse of the user's client.)
4. The user carries out the invention's Authentication Process without any additional steps. In fact, the authentic user will not even be aware that additional steps are being executed. Therefore, the network has become more secure without additional annoyances to the legitimate user. Key steps of the invention's Authentication Process are totally transparent to the legitimate user.
5. The invention cannot be overcome with hacking, i.e., mimicking of electronic messages sent to the Authentication Server. Instead it requires a host of non-hacking skills and methods to penetrate its security measures.
6. The invention gives network administrators an entirely new dimension in which to pursue security. In doing so it changes the dynamics between the network and the unauthorized user. This alone adds to the level of security for the Network. Clever network administrators will find additional ways to employ the invention to thwart unauthorized users.

As we have seen, the invention is not susceptible to the traditional hacker's trick of just sending an electronic message to the Authentication Server that mimics the message an authentic client would send in the authentication process.

But, as with all security systems, it can be fooled. Some of the methods by which the system's defenses could be compromised are listed under the next section titled "Spoofing."

As will be seen, the Spoofing problem quickly devolves into one reminiscent of the Radar Field. That is, for each measure taken by the network to stop unauthorized access, the spoof attempts to break it down with a counter-measure. To which there is, in turn, a counter-counter measure. And so on. This is very similar to the situation that has existed in radar since World War II.

The following section will go through several generations of measure/counter-measure, the only limit to this being the ingenuity of those playing the measure/counter-measure game.

But a key element of the invention will not change, namely basing network security on direct (or quasi-direct) empirical measurements of physical quantities of the client/user and then including these measurements as part of the authentication process for access to the network.

The fact that the Authentication Process is not foolproof in no way detracts from its benefits.

Spoofing

The invention includes a system and method for empirically obtaining user/client information and then including this information as part of a computer network authentication process.

An example of the invention has been described that uses physical location as the quantity that is empirically measured. Other physical quantities could be used. In addition, the preferred example uses a particular method to obtain the empirical measurements of the physical location. Other methods are possible.

Spoofing is the act of an unauthorized user, $C_S$, trying to represent himself as an authorized user, $C_A$. He does this by fooling the system into thinking that he not only has the proper User Credentials, but that he also has the same empirically measurable physical quantities as the authorized client/user. In the example described above, this would be fooling the system into thinking that the spoof (i.e., unauthorized user) is at the proper physical location.

The response then of the Network to this is to employ a new (or an additional) method to obtain further empirical data on the user/client, i.e., the invention's authorization process is modified. Unauthorized users will then try new methods to fool it. This then spurs yet additional measures on the part of the Network.

Three additional things should be noted:
i) The invention has raised the hurdle to unauthorized access. For example, whereas in the prior art the hacker could just try to guess access codes and ID's, the potential unauthorized user must now come up with additional information such as:

pulse signature for a specific client position of satellites information specific to a particular client, e.g., pulse signature, processor ID, clock synchronization (such as that used by the Global Positioning System), possible hidden information that is built into non-volatile ROM (similar to how BIOS/FLASH information is installed), time coding of hidden information, etc.

distance from $C_A$ to $C_S$. This may require going to the exact physical location of the client that is the target of the spoof knowledge of which client a given user is assigned to. (In a building with several authorized users, this adds considerable difficulty to the spoofing problem.)

ii) In the example, authentication works by requiring each user to use a particular client. It also includes both empirically gathered client data and user credentials as part of the authentication process.

Because of this, the authentication system of the example has the additional benefit of exposing users who are potential security risks. That is, for a spoof to break into the system, he must have intimate knowledge about both the user and the user's client. If a spoof tries to break into the system, and only partially succeeds on the first try, he will expose which client and user he is trying to mimic. The Network Administrator would definitely want to discuss this with the authentic user.

The invention has taken away from the hacker the trial-and-error approach to breaking into the system.

iii) Employee Spying

The authentication system could also be employed to stop random employees from logging onto the system using their fellow workers computers. For example, if employee X decides to use employee Ys computer he could do so under the prior art by just using his own access code. But in the example authentication system, he would be denied because his access code is only authentic for his computer i.e. his computer's location.

Several generations in the Measure/Counter Measure battle will now be discussed.

Spoof: Time-Staggered Narrow Beamed Pulses (See FIG. 7)

$C_S$—Spoof trying to appear as $C_A$.

$P_{Ei}$—Position of the satellite $E_i$ (i=1, 2, 3)

$D_{Ai}$—Distance from $C_A$ to a satellite $E_i$ (FIG. 6)

Figure 7:
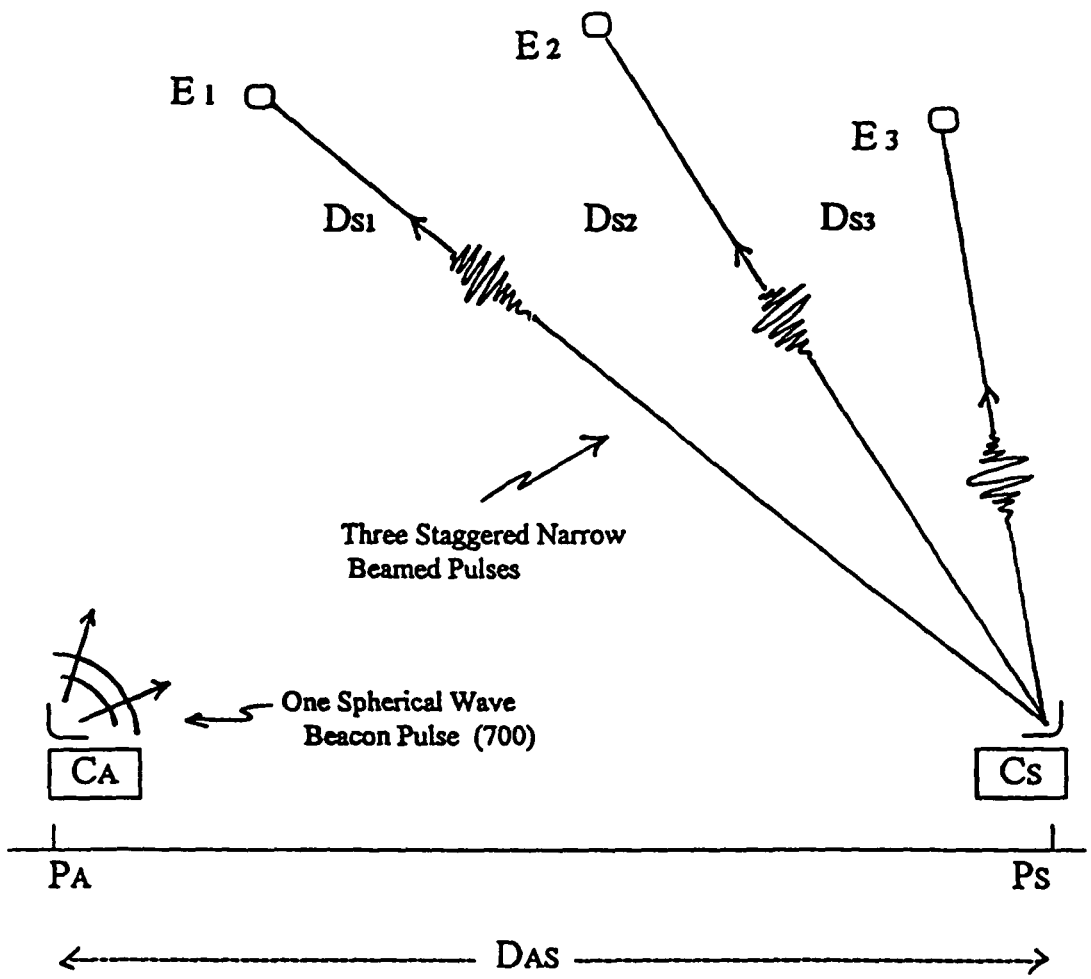
FIG. 7 is a high level block diagram illustrating the differences between the spherical EM beacon pulse (700) emitted by an authorized client $C_A$, at position $P_A$, and the three time-staggered narrow beamed EM pulses emitted by a spoof $C_S$, at position $P_S$, trying to fool the network security system into thinking it is at position $P_A$.

$D_{Si}$—Distance from $C_S$ to a satellite $E_i$ (FIG. 7)

$D_{AS}$—Distance between $C_A$ and $C_S$ $P_A$—Position of the authorized client $P_S$—Position of the Spoof $t_{Ae}$—Emission time from $C_A$ of a signal the spoof wants to imitate $t_{Sie}$—Emission time of a spoof signal directed at satellite $E_i$ (i=1, 2, 3)

$t_{Ai}$—Time that a spoof signal is to be received at the satellite $E_i$ (i=1, 2, 3)

As we have seen, in one example of the invention, the Authentication Process works by having an authorized client, $C_A$, emit a beacon (700). This beacon is, for example, a spherical radio wave of a given frequency and/or pulse shape. (Note: This could be any frequency of electromagnetic radiation, or even non-electromagnetic radiation.) The emission is just a beacon. It is not a message stating the location of the client.

In the example, there are satellites (possibly three or more) that intercept this beacon signal. The satellites record the time $(t_{A1}, t_{A2}, t_{A3})$ that each of them intercepts the beacon pulse. This information is then transmitted to the Authentication Server computer. From this empirical data the location of the client is determined.

Even if the Spoof, through some method, has obtained the characteristic signature pulse of the client $C_A$, the assigned emission time $t_{Ae}$, and the credentials of $C_A$'s user, he still must overcome the invention's "location determining system." He could try to do this by emitting radio signals from his position $P_S$ which are received by the satellites and misinterpreted as being from the position $P_A$.

As an example, the Spoof, $C_S$, could try to defeat the Authentication System in the following way:

i) He must determine the position, $P_A$, of the authorized user. One way to do this is to use a GPS (Global Positioning System) measurement to get the precise coordinates of $P_A$. [Obtaining this information is a non-trivial exercise and therefore raises the hurdle to unauthorized access.]

ii) He needs to know the distances $D_{Si}$ and $D_{Ai}$ (i=1, 2, 3). One way to do this is to get the exact positions of each of the satellites $P_{Ei}$ as a function of time. Once these are obtained he can calculate distances $D_{Si}$ and $D_{Ai}$ from his location, $P_S$, to the satellites and from the authorized client's location, $P_A$, to the satellites. [There are many ways to get the positions $P_{Ei}$. One of these is to use Radar.]

iii) Calculation of Beacon Intercept Times For $C_A$

By knowing the $D_{Ai}$ the spoof can calculate what the relative intercept times $(t_{A1}, t_{A2} t_{A3})$ would be of a hypothetical spherical wave beacon emitted at $t_{Ae}$ from the authentic client $C_A$ to the three satellites. (Remember that it is these times that the satellites record as empirically gathered data on the client. And it is these times that the Authentication Server uses to calculate the position of the client. Therefore, it is these intercept times that the spoof will have to artificially create with a spoof EM signal in order to fool the invention's security system.)

iv) Calculation of Radio Emission Times For The Spoof Signal From $C_S$

The spoof wants to emit signals from his location so that they are intercepted by the three satellites in the same sequence as they would be if a single spherical wave were emitted from $C_A$. One way to do that is to emit three separate narrow beamed signals, one to each satellite. [Narrow beamed signals are required because if the spoof used three broad beamed signals each would be detected by more then one of the satellites, thus revealing him as a spoof.] But he must determine the proper sequencing. He does that in the following way:

Assume that the Spoof wants to imitate a hypothetical beacon signal emitted from $C_A$ at a particular time. Label the assigned time of emission as $t_{Ae}$. The spherical pulse wave would be received by the three satellites at times $t_{A1}, t_{A2}, t_{A3}$. The Spoof calculates these times from:

$$t_{Ai} - t_{Ae} = \frac{D_{Ai}}{c} \quad \text{[Equation 2]}$$

Here $(t_{Ai}-t_{Ae})$=transition time c=speed of light

He now must calculate the time of emission, $t_{Sie}$ (i=1, 2, 3), of each of his three narrow beamed signals such that they are intercepted at their respective satellites at the time $t_{Ai}$. Since he knows the distance, $D_{Si}$, that each beam must cover and the time, $t_{Ai}$, at which he wants it to arrive, he can write:

$$t_{Ai} - t_{Sie} = \frac{D_{Si}}{c} \quad \text{[Equation 3]}$$

Where $(t_{Ai}-t_{Sie})$=transition time
Solving Equation (3) for $t_{Sie}$ gives:

$$t_{Sie} - t_{Ai} = \frac{D_{Si}}{c} \quad \text{[Equation 4]}$$

Substituting for $t_{Ai}$ from Equation (2) gives:

$$t_{Sie} = \frac{[D_{Ai} - D_{Si}]}{c} + t_{Ae} \quad \text{[Equation 5]}$$

The Spoof then knows that if he emits three narrow beamed signals at the staggered times $t_{S1e}$, $t_{S2e}$, and $t_{S3e}$, respectively, to the three satellites $E_1$, $E_2$, $E_3$, they will be received at times $t_{A1}$, $t_{A2}$, and $t_{A3}$.

iv) Spoof Authentication Process

The spoof then starts the Network Authentication Process as has been previously described. But at step 4 (b) he replaces the single spherical wave beacon that the authentic client $C_A$ would emit, with three spoof beams. The spoof beams are three narrow beamed radio signals with staggered emission times $t_{S1e}$, $t_{S2e}$, and $t_{S3e}$. The satellites $E_i$ intercept these narrow beamed signals and record the intercept times $t_{A1}$, $t_{A2}$, and $t_{A3}$.

The satellites would send this empirical time of reception data to the Authentication Server. The Network would then use the above described position calculation method and erroneously conclude that the signal had come from the authentic client $C_A$. And would thus allow access to the spoof $C_S$.

Network Counter—Measures to Spoof

The Network must now try to implement methods that would expose this type of Spoof We note that the spoof, $C_S$, differs from the authentic client, $C_A$, in at least four fundamental ways:

i) He is in a different physical location
ii) He is emitting a different signal form (i.e., $C_A$ emits one spherical wave whereas $C_S$ emits three narrow beamed signal.)
iii) He does not have an authorized client. The authorized clients have hardware, clock synchronization, hidden BIOS-type nonvolatile ROM with Network information stored in them, and other client specific data registered with the Network.
iv) He is not being used by an authorized user.

The invention's approach is to employ an additional empirical process to measure one or more of the above fundamental differences and then to include these in the Authentication Process. This will expose the spoof and deny him access to the network. Some of these will now be listed.

Any one of the following steps may be added to the invention's Authentication Process.

a) Interactive Approach

After the first five steps of the Authentication Process that have already been described, additional ones can be added. For example, over normal communications links, the Authentication Server orders the requesting client to emit a particular radio signal "now." The Network then knows the time the signal was emitted and the time it was received by the three satellites. It can then calculate the distances from each satellite to the emitter and compare these to the $D_{Ai}$ it has in its database for the authentic client. (In this method, the Authentication Server doesn't assume that the signal was emitted at $t_{Ae}$)

[Remember the example system is a "closed" system. When a new user is brought on, an official from the Network could go to the physical location of the authentic user and install the client. He then does several things, such as: synchronizing the clock, doing checks to see how long the response time is to a signal to transmit "now", having the client/Authentication Server linked through PC Anywhere such that the commands to the client are being given directly by the Authentication Server, etc. These all become part of the Authentication Server's database. And can be used at later times to check the authenticity of an access request.]

Figure 8:
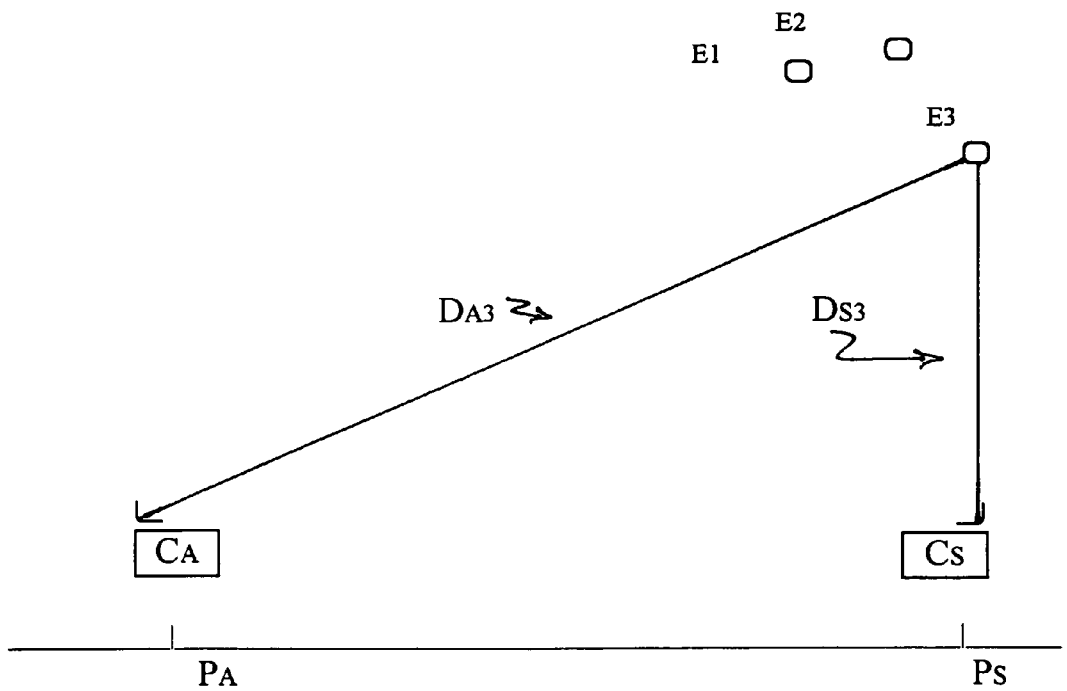
FIG. 8 is a high-level block diagram showing the relative distances to a particular satellite from $C_A$ and from $C_S$.

Spoof counter-counter measures (See FIG. 8):
The Spoof targets a client such that
$D_{Si} < D_{Aj}$ for all i and j If $D_{Si}$ to all three satellites is less than $D_{Ai}$ to all three satellites, then the spoof could build software that would take the Authentication Server command to emit a signal and delay the emission to make it appear that the $D_{Si}$ are longer then they are.

But note that this further raises the hurdle. First it requires the spoof to find an appropriate target client. And the fact is that there may not be one. Second, he is then required to get the user credentials of the person with that particular client.

Continuing, there are a variety of ways to employ the Interactive Approach. For example, there are many things that can be one to the client to make it unique. The Network could encode into Nonvolatile ROM hidden information that is specific to that client. One example would be to include a prearranged, but random, sequence of signature waveforms that would be used for the beacon. This sequence is known to the Network but not the user. In fact, even if the client were stolen, the information could not be obtained without the Management Entity. And therefore, the unauthorized user would be in a position of having to first obtain very secure data in order to break into the Network. And even if it succeeded in getting this data, it isn't clear that it would do the spoof any good. See Counter-Measures.

The counter measure to the spoof would be as follows: After the first five steps of the Authentication Process, the Authentication Server adds additional ones by asking that the client to emit a beacon at a particular time. In the hidden memory of the authorized client there is information as to the pulse shape the client is to use for this. The Authentication server (and satellites) wait to receive the correct pulse shape at the correct time. If they don't, access is denied.

The approach of the invention is not to be confused with the Global Positioning System (GPS). GPS works in a very different way. (See FIG. 8A) GPS is used by a client to determine its own position and to stop others from interfering with that determination;

whereas, in the invention, the Network is trying to empirically determine the position of a remote client and to prevent an unidentified client from misrepresenting its position.

Figure 8A:
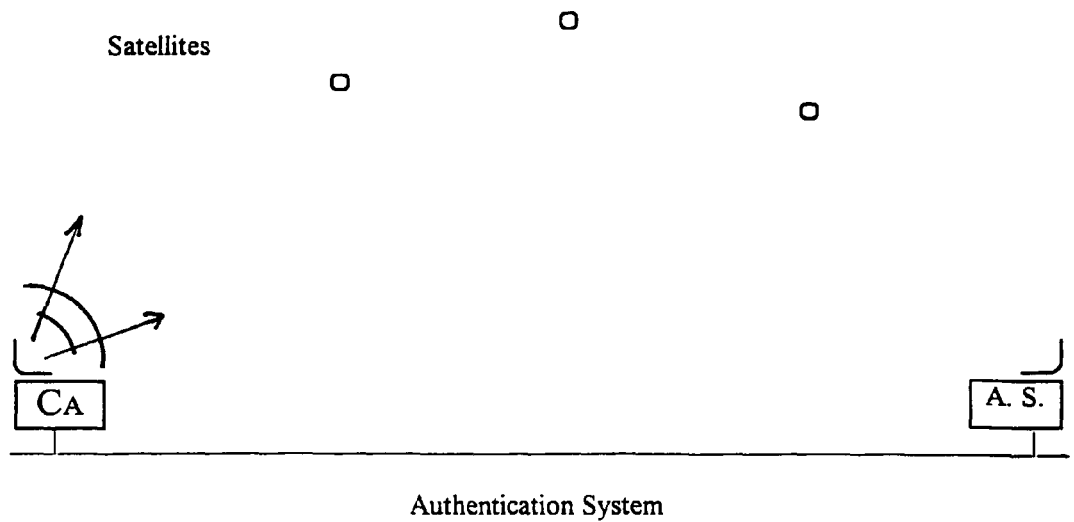
FIG. 8A is a high level block diagram and flow chart showing the relative differences between the operation of a preferred embodiment of the current invention and the operation of the Global Positioning System.
Figure 8A:
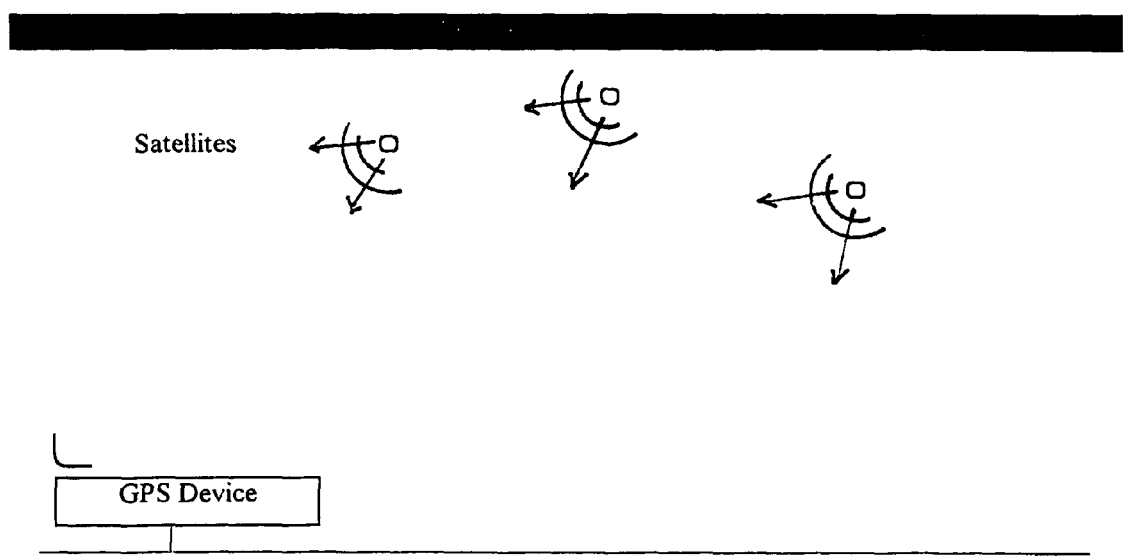

Comparison of GPS to the Authentication System: [See FIG. 8A]

Authentication System—a single time coded specific, but random, beacon pulse is transmitted by a requesting client. This is detected by multiple satellites. The Authentication Server uses this information to calculate the position of the requesting client.

GPS—multiple satellites send out time coded specific, but random, signals. These are detected by a GPS receiver and from the relative time sequences of the reception of the different signals the receiver can calculate its position.

b) Spherical (Omni-directional) Wave Detection

In this counter-measure the Authentication System uses any available technique to detect omni-directional radio waves. If it doesn't detect omni-directional waves, it denies access. That is, it uses some method to distinguish the nature of the waveform itself. For example, there could be additional satellites that are not publicly known to be part of the system. These will intercept the spherical waves but not the narrow beams from a spoof.

c) Angle Detection

The data stored in the Authentication Server database includes not just the position of all authorized clients but also the direction from them to each of the satellites. The satellites could carry antennas equipped to detect the direction from which the emitted signal is coming from. (These could be Phased Array antennas for example.) This additional empirical information could then be checked against the Authentication Server's database. The directions measured will be different for $C_A$ and $C_S$.

d) Satellites Emit Narrow Beamed Command to the Client

Figure 8B:
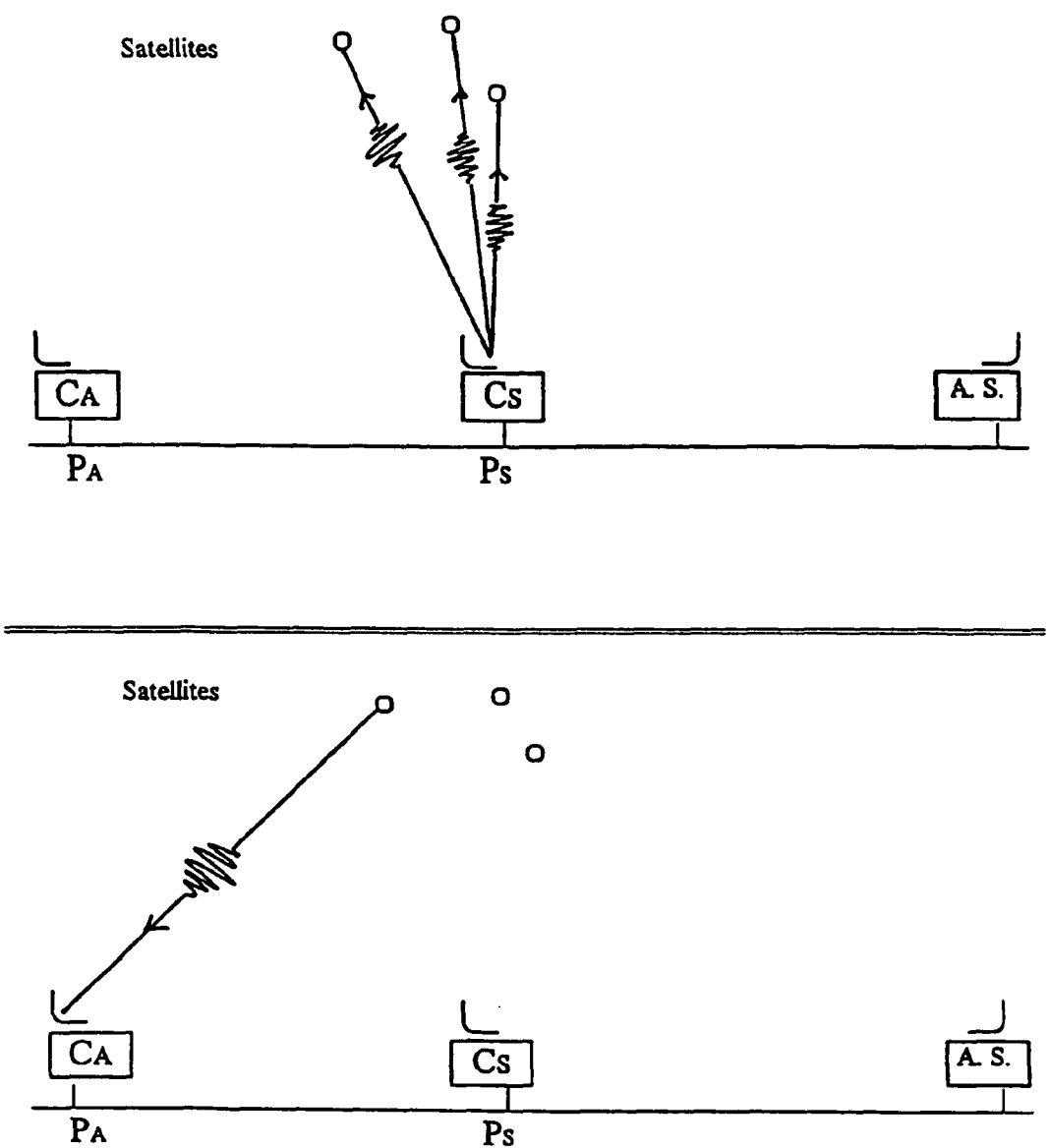
FIG. 8b is a high level block diagram and flow chart showing the sequence first of the spoof $C_S$ emitting three staggered narrow beamed pulses which try to fool the current invention's security system into thinking that its location is at $P_A$ and second the response of the Authentication Server of the present invention to order the satellites to transmit a narrow beamed message to $P_A$ as a means of exposing the spoof

The spoof has started an authentication process by transmitting to the Authentication Server its User Credentials and by transmitting radio signals to the satellites that are deliberately designed to be misinterpreted as the beacon from the authorized user $C_A$. In other words, an unidentified client wishing to gain access to the system is, in fact, stating that it is at the location, $P_A$, of the authorized client $C_A$. (See FIG. 8b—Top Portion)

This counter-measure verifies that statement by adding the following steps to the Authentication Process: The Authentication Server orders one or more of the satellites to transmit a narrow beam command (See FIG. 8b—Lower Portion) to the physical position that the client is supposed to be at (again, this can be done with Phased Array antennas for example.) This message directs the client to do something that can be verified, e.g., send a particular message to the Authentication Server. If it doesn't respond, access is denied.

This then forces the spoof to have a receiver within a specific vicinity of the authentic client CA. Therefore, again, the hurdle to unauthorized access has been raised.

e) System and Method for Encrypting Messages to a User/Client with Decryption Based on Inherent Physical Properties of the User/Client The general concept can be stated as follows: Information to a recipient is encrypted in such a way that certain inherent physical properties of the recipient itself are used as "keys" that automatically decrypt the messages. This is an inventive concept independent of computer network security invention. The remainder of this section, though, will be devoted to disclosing how this concept could be employed in the area of computer network security. Appendix E gives a more detailed description of the basic concept and two additional examples of how it could be used. [See also parts (e) and (j) of the section titled "Alternate Embodiments"]

In the case of computer network security, messages to the requesting user/client are encrypted in such a way that certain inherent physical properties of the user/client itself are used as "keys" that automatically decrypt the messages. In other words, if the client is who he says he is, then the message will arrive in-the-clear.

The encryption method is designed specifically for the physical property of the user/client that the Network intends to use to decrypt the message. If a different physical property is used, it will demand a different encryption method. But the general concept will not change: Build the encryption method so that an inherent physical property of the authorized user/client itself decrypts the message automatically.

Consider the situation where an unidentified client requesting network access has, as prescribed under Authentication Process steps 1 through 5, sent an access message to the Authentication Server and has emitted a radio signal that has been interpreted by the Authentication Server as a beacon signal from the authorized location. In essence, the requesting client is stating that it is at a particular authorized position $P_A$. (See FIG. 7)

The approach of this counter-measure to spoofing is for the Authentication Server to send a command to the client such that:

1. The message can only be read by the authorized client, that is, by a client with the physical quantities that this client is known, by the Network, to possess. This translates into "The message can only be read at the stated physical position $P_A$."(See FIG. 9 and compare to FIG. 7)

2. The message is, for example, a command that orders the client to take a particular action. The Authentication Server then verifies that the action has been taken and notes the response time.

[The specific response time of the authentic client $C_A$ has been calibrated as part of the initial setup for the user with that client. This can be done by having the network send a representative to $P_A$ with the client $C_A$. The Authentication Server then executes the sequence of steps listed below making note of the elapsed time, i.e., the amount of time for the client $C_A$ to respond. This is then stored in the database of the Authentication Server as empirical data and used as part of the Authentication Process.]

3. If there is no response within a certain specified time period, access is denied.

This method will defeat the spoofing measure described above.

The details of the method will, of course, depend on the particular physical quantity of the authorized client that is used. In one example, the quantity is its physical location. The steps listed below are tailored for this. But the method that this illustrates is more general in that it applies to other possible physical quantities also.

Note that even though we will restrict the following description to an encryption method based on physical-location decryption, there are still several ways that the message could be encoded. Two of these are discussed in the section title "Alternate Embodiments" parts (e) and (j).

A detailed description of one type of spatial decryption method and counter-measure will now be given.

Figure 9:
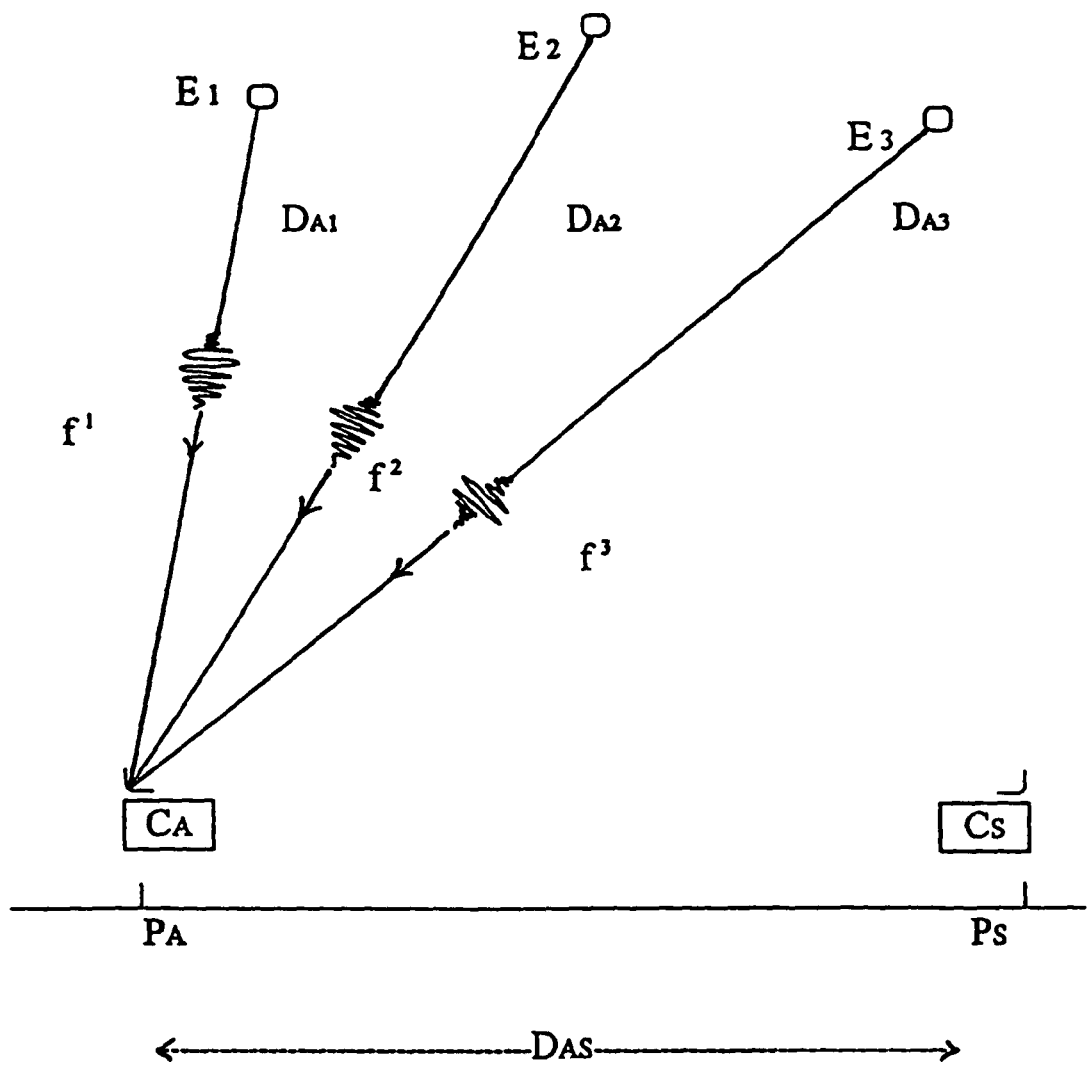
FIG. 9 is a high level block diagram and flow chart showing the three partial sums $f^1$, $f^2$, and $f^3$ that superpose at the point $P_A$ to form the command $f(t, P_A)$ which is only intelligible in-the-clear at $P_A$. These partial sums can be omnidirectional beams or narrow beamed EM pulses.

Eigenfunction Decomposition Encryption with Decryption Based on Physical-Location-Dependent Superposition Used as Part of the Authentication Process [See FIGS. 7 and 9]

The first goal of this counter-measure is to send a message to the client such that it can be understood at, and only at, the physical location, $P_A$ (i.e., the physical position the client requesting access has implied it is at.)

We will send the message as an electromagnetic signal from the satellites to the position $P_A$. In particular, we will have the three satellites transmit three different parts of an electromagnetic signal containing the message. When these superpose at the location $P_A$ they will form a message that is intelligible, in-the-clear, by the client. In addition, at any other physical position, the superposition of the three signals are unintelligible in-the-clear. [By the term "in-the-clear", we mean that the message needs no further decryption to be understood.] Stated another way: Encryption is based on a particular decomposition of the electromagnetic signal that is specifically designed with the foreknowledge of letting superposition and spatial position do the decrypting.

To execute this approach, the Network employs the principles of Eigenfunction Representation and Linear Superposition of Electromagnetic Waves. In doing so, it creates a novel method for encryption and decryption of messages.

The calculations given below follow the traditional method of using a complete set of orthogonal eigenfunctions to span a space. However, there are many other methods that could be used. For example, a spanning set of non-orthogonal over complete eigenfunctions could be used.

Information on this technique can be found under the Wavelet and Reproducing Kernel literature.

The actual technique employed is irrelevant to the concept of encoding and decoding a message based on the physical position of the user/client.

Figure 10:
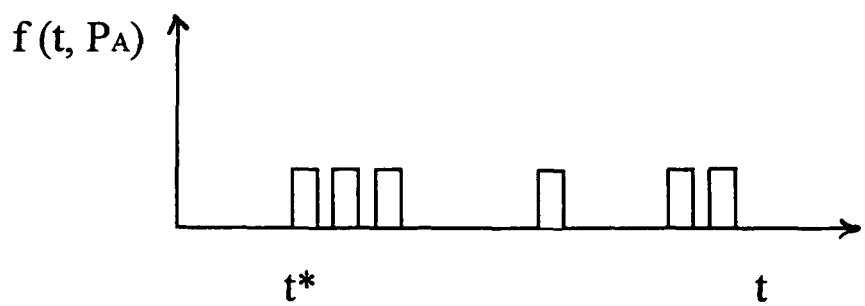
FIG. 10 is a diagram showing the shape and time dependence of a signal to be transmitted to the client.
Figure 10:
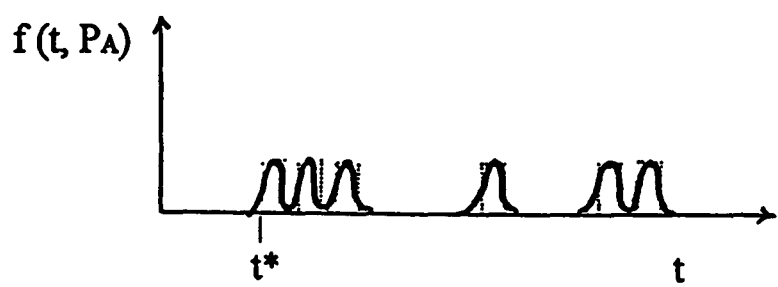

Consider then that the message we want the client to receive is in an electromagnetic signal, $f(t, P_A)$, such as that in FIG. 10. Here we have represented the signal as being digital in nature, but other forms are possible. The message starts at time t*. Physically, $f(t, P_A)$ could be the electromagnetic field itself or it could be a modulation of it.

Using a complete set of eigenfunctions, $G_K(t, P_A)$, the digital signal $f(t, P_A)$ can be expressed as:

$$f(t, P_A) = \sum_{K=0}^{\infty} g_K G_K(t, P_A)$$ [Equation 6]

$$\text{where } g_K = \int f(t, P_A) G_K(t, P_A) dt$$ [Equation 7]

See George Arfken, "Mathematical Methods for Physicists" and Harry F. Davis, "Fourier Series and Orthogonal Functions". Note that if the $G_K(t, P_A)$ are sines and cosines, then the above is a Fourier representation of the function $f(t, P_A)$. In this case we can associate electromagnetic plane waves with the basis set GK. (See Appendix C)

Many possible basis sets can be used to represent the function $f(t, P_A)$ as long as the selected set gives an accurate representation of $f(t, P_A)$.

The summation can be truncated to a finite number of terms M and still represent the signal adequately for our purposes (i.e., the message is intelligible.) See FIG. 10A for an example.

$$f(t, P_A) = \sum_{K=0}^{M} g_K G_K(t, P_A)$$ [Equation 8]

where M is some finite integer

Here we have picked K=0, 1, 2, ..., M, but other assortments are possible.

The representation can now be separated into three partial summations $$f(t, P_A) = \sum_{K_1} g_{K_1} G_{K_1}(t, P_A) +$$ [Equation 9]
$$\sum_{K_2} g_{K_2} G_{K_2}(t, P_A) + \sum_{K_3} g_{K_3} G_{K_3}(t, P_A)$$

$$f(t, P_A) = f_1(t, P_A) + f_2(t, P_A) + f_3(t, P_A)$$ [Equation 10]

where each partial sum, $f_i$, is itself an electromagnetic signal and we have defined $$f_i(t, P_A) = \sum_{K_i} g_{K_i} G_{K_i}(t, P_A) \quad (i = 1, 2, 3)$$ [Equation 10A]

The partial sums are over different values of the index K, such that together they add to the set (0, 1, ..., M). For example:

$K_1$ ranges over the set (1, 7, 8, 9, ... M−1)
$K_2$ ranges over the set (0, 2, 3, 10, 11, ... M−2)
$K_3$ ranges over the set (4, 5, 6, 12, ... M)

such that the three sets together contain all the integers from 0 to M. [Note that other arrangements of the integers from 1 to M among the three sets $K_1$, $K_2$, and $K_3$ are possible.

The issue is to divide the information between the three partial sums in such a way as to make it the hardest for a Spoof to analyze. One way to do this is to employ the methods of Maximum Entropy. (See the publications of J. P. Burg and Edwin T. Jaynes.)]

Figure 11:
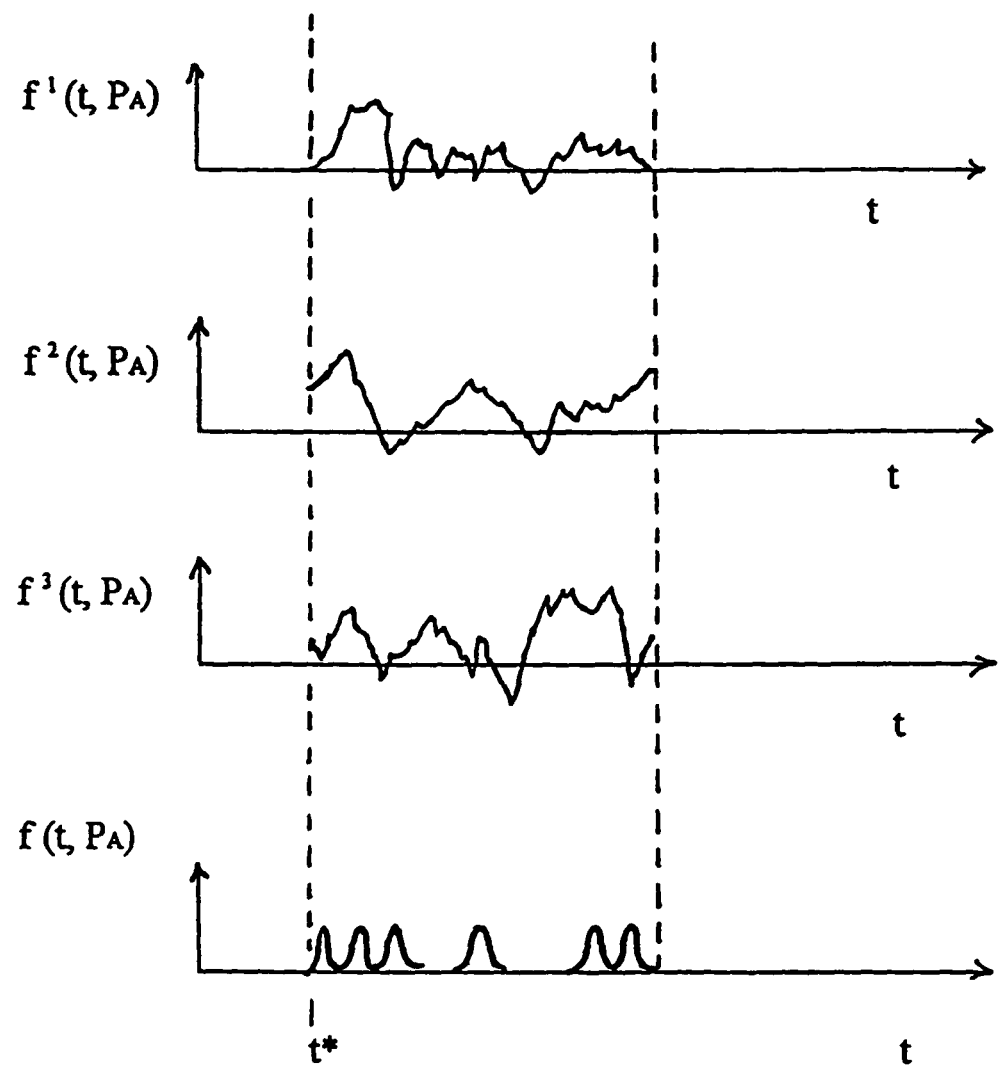
FIG. 11 is a graphic representation of the partial decompositions $f^1$, $f^2$, and $f^3$ showing that they are individually unintelligible but that their superposition forms the intelligible signal f (t, $P_A$).

There is one condition on this separation. It must be done in such a way that each of the partial summations, $f_i$, alone conveys no meaning relative to the full message f, i.e., each partial sum is unintelligible. (See Appendix D) One way to help ensure this is to pick M small enough such that the full representation of $f(t, P_A)$ in Equation (8) is just barely adequate, i.e., it just barely intelligible to the authentic client $C_A$. Then any one of the partial sums $f_i$, by itself, will be unintelligible to the client as the intended message. (See FIG. 11.) Other than this requirement, the separation may be done in a variety of ways.

In essence, the above decomposition has given us three electromagnetic signals which, when superimposed at $P_A$, will add to become the message $f(t, P_A)$. We now want to associate each of these partial sums, $f_i$, with a particular satellite Ei.

Figure 11A:
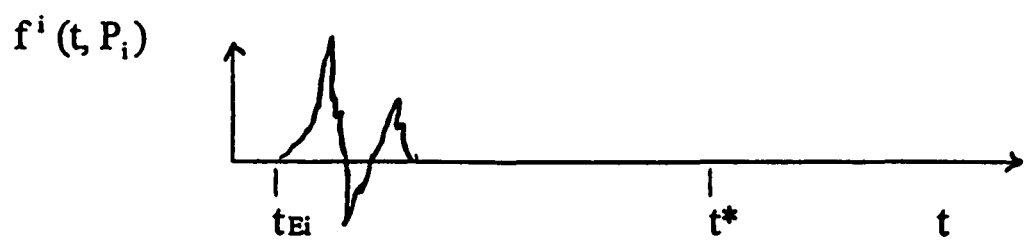
FIG. 11A is a graphic representation showing how the shape of an EM pulse remains the same at Pi and $P_A$ but that it has been shifted on the time axis.
Figure 11A:

We start by noting that the shape of the partial representation $f_i$, at satellite $E_i$, will be the same as when it arrives at the desired location $P_A$. What is different is that the pulse has been shifted on the time axis. (See FIG. 11A) Therefore, all we need do is calculate the retarded time $t_{Ei}$ that satellite $E_i$ would have to emit $f_i$ at such that it will propagate to $P_A$ and arrive at time t*.

[Note that the concept of "Spatial Encryption" is partly based on retarded time of emission $t_{Ei}$. That is, we know that there is only one location on the surface of the earth where, if we emit at times $t_{E1}$, $t_{E2}$, and $t_{E3}$, the three signals will arrive simultaneously. This is basically the reverse problem from that used to calculate the location of the client from its beacon signal. Therefore, at any other location the three signals will not arrive simultaneously. And will not superpose in the designed way.]

Calculation of the emission time $t_{Ei}$ of the partial wave $f_i$:

The distance from the authorized client $C_A$ to satellite $E_i$ is $D_{Ai}$. If we want each of the three signals to reach the client at time $t^*$, then they have to be emitted at staggered times $t_{Ei}$ where $$t^* - t_{Ei} = \frac{D_{Ai}}{c} \quad \text{[Equation 11]}$$

Here $(t^*-t_{Ei})$ the time interval between emission and reception of the signal (i=1, 2, 3)

Solving Equation (11) for $t_{Ei}$:

$$t_{Ei} = t^* - \frac{D_{Ai}}{c} \quad \text{[Equation 12]}$$

This gives the relative times ($t_{E1}$, $t_{E2}$, and $t_{E3}$) at which each satellite must emit its signal such that the three partial representations $f_1$, $f_2$, and $f_3$ arrive at $P_A$ at the same time $t^*$ That is, they arrive at the proper time and location to superpose to form the full signal $f(t, P_A)$.

The technique will work whether the three transmitters are coherent or incoherent. However, there are advantages to making them coherent.

Coherence between the three transmitters can be maintained by knowing their phase relationship and the distances between them.

Distances can be found using Laser Ranging techniques. Coherence can be established in several ways. One example would be to use three synchronized atomic clocks. Each transmitter is electronically linked to one of the atomic clocks. Then the electromagnetic signals $f_1$, $f_2$, and $f_3$ can be emitted coherently. [Other examples can be found in the literature on Beam Forming techniques used for acoustic arrays and Hot Spot Tracking from Synthetic Aperture Radar.]

To summarize, if each satellite, $E_i$, transmits the electromagnetic signal $f_i$ at the time $t_{Ei}$, the signals will propagate such that they will all reach $P_A$ at the time $t^*$ and superpose to form $f(t, P_A)$. Here $f(t, P_A)$ is the command the Authentication Server wants to give to the client who is supposedly at $P_A$.

Note though that at any other physical location (e.g., $P_S$ which is outside a cell around the point $P_A$) the electromagnetic signals $f_i$ will have no meaning, either singly or superposed. They will be unintelligible singly because we specifically constructed them to have no meaning singly.

Figure 12:
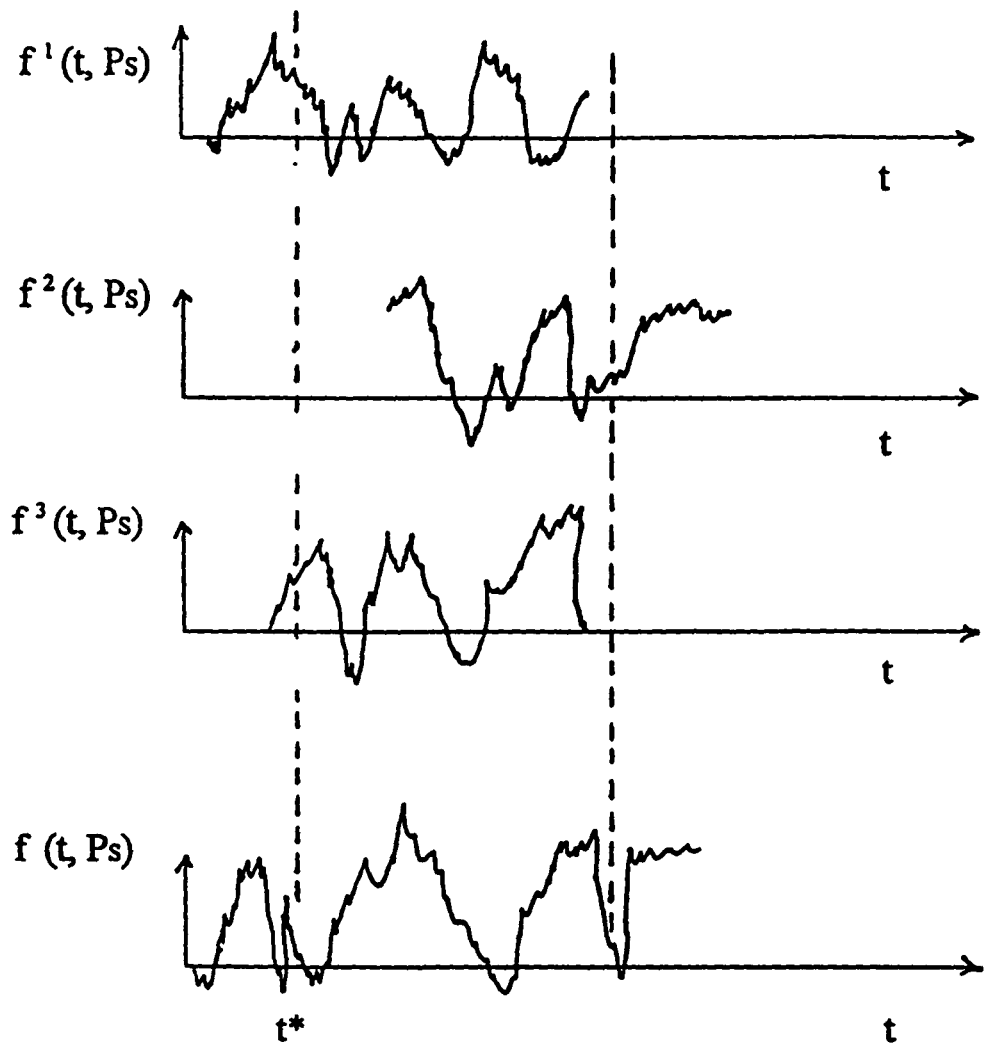
FIG. 12 shows the time dependent graphs of the functions $f^1$, $f^2$, and $f^3$ as they appear at the position $P_S$ and that they are displaced in time relative to one another and that therefore they do not superpose to form an intelligible command.

They will be unintelligible even when superimposed because these other locations will have different transition time intervals between emission and reception. Thus the signals will arrive displaced from each other in time. (See FIG. 12 and compare it to FIG. 11) And this will destroy the sensitive phase relationship that must be maintained between the different signals $f_1$, $f_2$, and $f_3$ in order for them to superimpose to give $f(t, P_A)$.

Therefore, the signal $$f(t, P) = f_1(t, P) + f_2(t, P) + f_3(t, P)$$

only has meaning, in-the-clear, within a cell around the physical location $P=P_A$ That is, it can be read, and only read, by the client at $P_A$.

Figure 13:
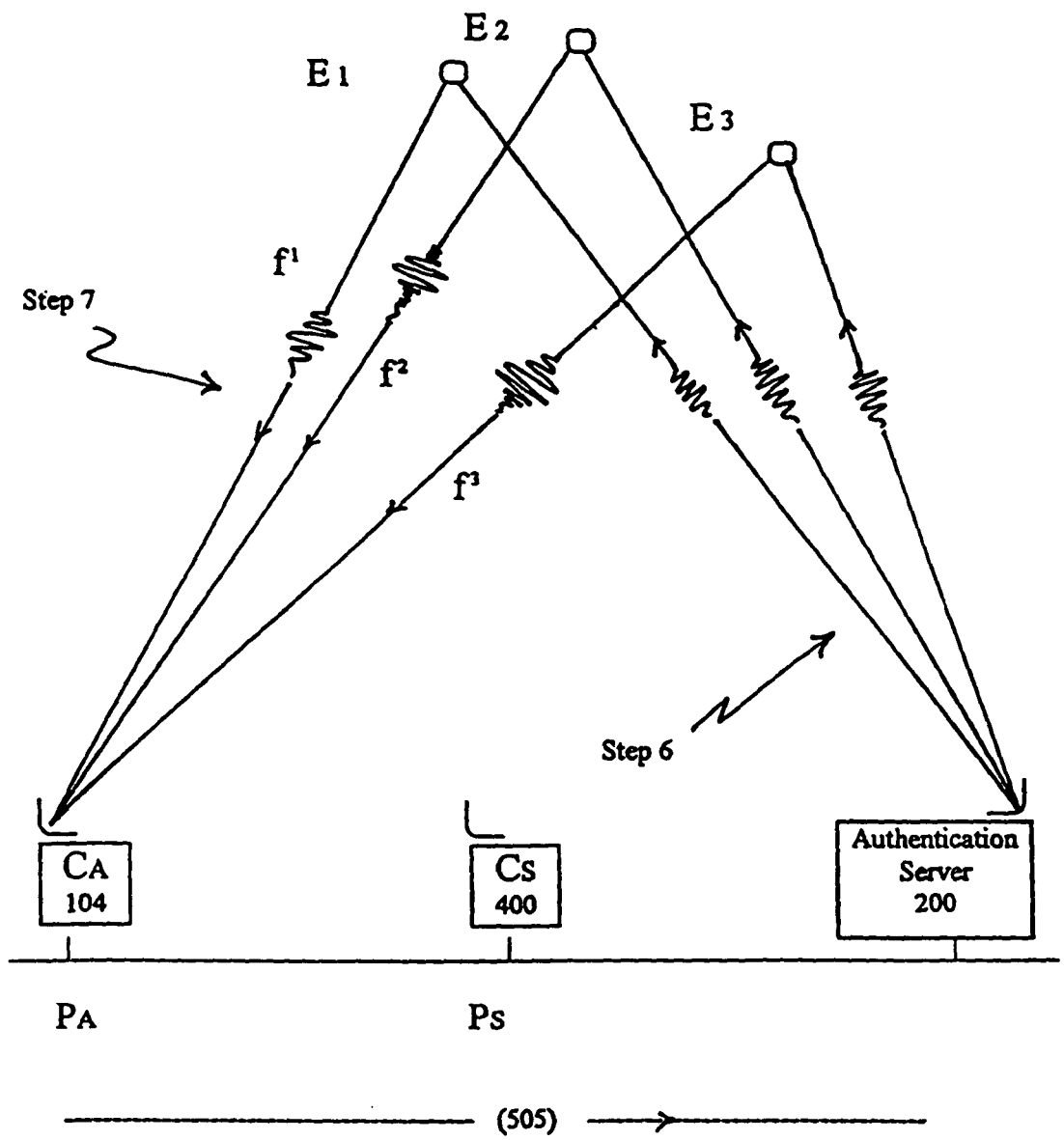
FIG. 13 is a high level block diagram and flow chart showing the sequence of the Authentication Server ordering the satellites to transmit partial representations $f^1$, $f^2$, and $f^3$ to the position $P_A$ and then the partial representations actually being transmitted.

Once the above analysis has been completed the Network executes the following steps as a means of authenticating the physical location of the requesting client:

The authentication process (steps 1 through 5) is modified by adding the following steps:

6. The Authentication Server orders the satellites to transmit $f_1$, $f_2$, and $f_3$ at times $t_{E1}$, $t_{E2}$, and $t_{E3}$ respectively.
7. Satellites receive the order and comply. (See FIG. 13)
8. At the location $P_A$, the three signals arrive at time $t^*$ and superimpose to form the complete command signal $f(t, P_A)$. The Authentication Server knows the time $t^*$. The command $f(t, P_A)$ is in-the-clear. No analysis needs to be done to decipher it.
9. If the requesting client's antenna is at $P_A$ it reads this command.
10. The command orders the client to perform a task that is verifiable by the network. For example, it orders the client to transmit a particular message via the already existing communications channel (505) to the Authentication Server.
11. The Authentication Server waits to verify the response from the client. It also notes the nature of the response and the time at which the response comes in.
12. In its database the Network has the response time of the client $C_A$. This was empirically determined at the time of the initial setup of the client and the user.
13. If the correct response does not come within the specified time, access is denied.

These additional steps will expose a spoof using the measures described above.

Spoofing Counter-Counter Measure to: Superposition Encryption with Decryption Based on Physical Location 1. Spoof picks a physical location that is within the cell that the network can resolve. Or it just places an antenna in this cell.

This spoof counter-counter measure will work, that is, it will defeat the eigenfunction decomposition countermeasure if the spoof can also comply with the command. Even so, it forces the spoof to place a physical antenna in the authentic client's cell. Therefore, the eigenfunction decomposition counter-measure has succeeded in raising the hurdle to accessing the network. Note that the smaller the cell the harder the spoofs problem is.

2. Mathematical Analysis of the partial waves.

At any location except Phd A the partial sums $f_i$ individually and as a sum are unintelligible in-the-clear. But it might be possible to use mathematical techniques to decipher the message. For example, if the spoof could intercept the three messages independently and then mathematically slide them back and forth along a time axis he might be able to artificially get the proper superposition to decipher the message. But this will take time. And it is this empirical variable that the Network is keeping track of. So that if the response time is too long, which is an indication that the signal is being analyzed, access is denied.

Figure 14:
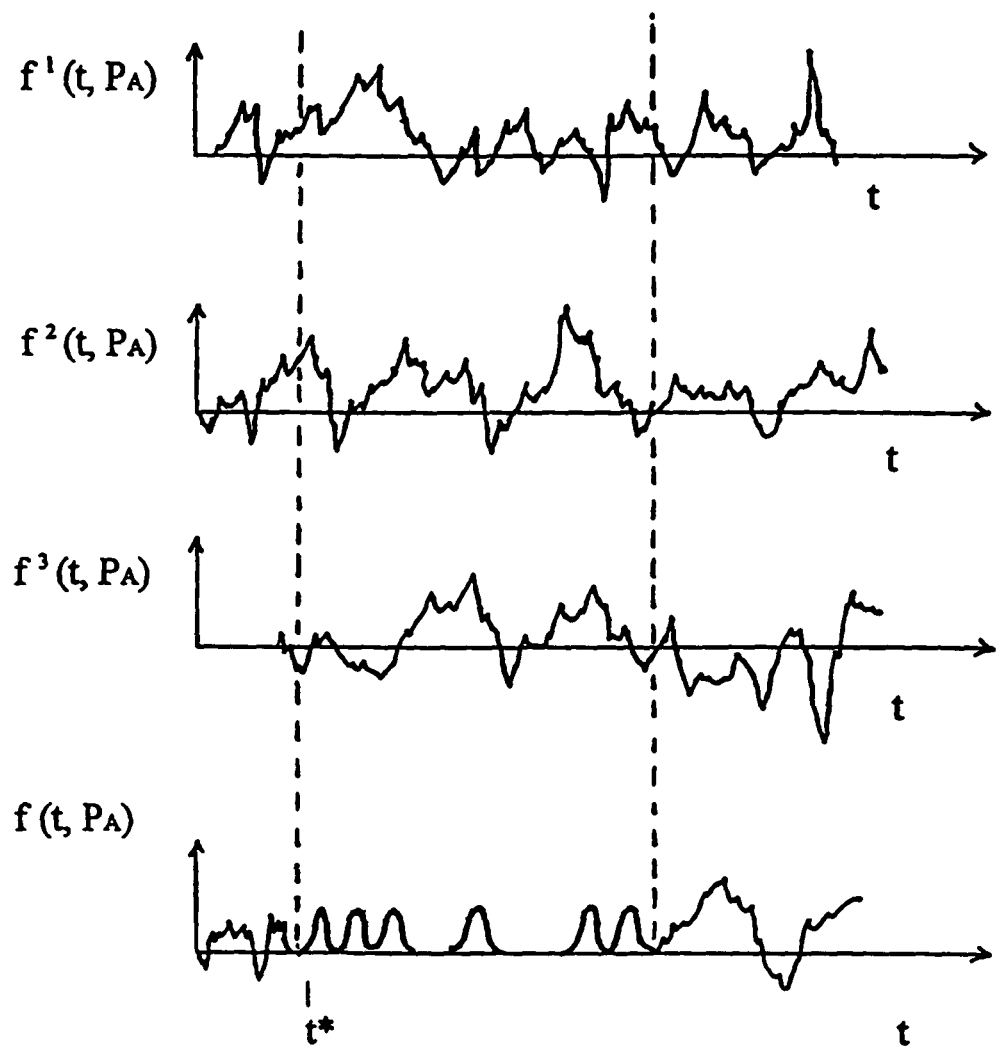
FIG. 14 shows the time dependent graphs of the three partial representations that have now been disguised to thwart mathematical analysis by a spoof

To make things more difficult for the spoof trying to analyze the signal, the network could employ many techniques. (See FIG. 14.) Some of these are:

i. Adding noise.
ii. Deliberately adding nonsensical waves before and after the message part of the signal.
iii. Staggering starting time and length of the emissions from the satellites.

iv. Assuming that there are many clients, there will be many commands going out from the satellites. It wouldn't be clear to the spoof which of these he should be analyzing unless he has specific information about individual clients. Again, this raises the hurdle to unauthorized access.

v. Change the basis set $G_K(t, P_A)$.

Note that the authentic client never needs to do any analysis. There is no decryption necessary at the physical site $P_A$. Therefore, the Authentication Server can represent the command $f(t, P_A)$ any way it wants to. And it can make changes without ever notifying the authentic client.

vi. False signals can be sent out by the Network.

vii. The command signal $f(t, P_A)$ might only be a statement to execute a particular command that is hidden in a set of commands that is stored in Non-volatile Read Only Memory. Therefore, decoding it will not do any good unless the spoof also has the set of hidden commands.

Alternate Embodiments

Other embodiments are within the scope of the claims.

Any or all of the variations described here can be used at the same time with the methods already described and they could be combined into more complex authentication processes.

a) Cellular Phone System Replaces Satellites for Empirical Data Gathering.

The cellular phone system infrastructure has built into it a mechanism whereby it can calculate the physical location of the "user". It is the only way the system knows when to hand off a moving user and to what station the user needs to be handed off to. In fact, recently the FCC has looked into the possibilities that Cellular Phone companies be required to give the location of a 911 call to within 125 feet.

The Authentication System could employ this technology in the following way: Clients have a cellular phone electronically connected to them. Logging on commands the cell phone to emit a signal. The Cellular Phone System receives the signal and determines where it has physically come from. The Cellular Phone System then transmits this information to the Authentication Server.

b) Employing the Global Positioning System (GPS)

The GPS satellites emit prearranged but random signals that are known to the GPS management.

These random signals could, if known in advance, be employed by the invention. There are many ways that these signals could be used. For example, they could be incorporated into signals from the Authentication Server, or that are stored in nonvolatile ROM, to form a complete command to the client. Also, this could be done in such a way that the message depends on the position of the client.

c) Caller ID

If traditional phone lines are used by the client to access the network, then the network could use caller ID to help identify the client. That is, during initialization the authorized client's phone is identified by the network. A spoof trying to mimic the authorized client would have to mimic the phone line itself This, of course, would fall under traditional telephone service fraud. The phone companies have extensive divisions to deal with this.

Assume the spoof has somehow managed to fake the Caller ID system into thinking that it is calling from one line, whereas, it is really calling from another. To expose this the Authentication Server institutes the following sequence. Once it gets the initial call from the client and reads the Caller ID phone number and access codes, it disconnects. It then calls the stated phone number itself. The only way for the spoof to break this is to physically intercept the message as it is transmitted over the line to the proper number.

Another way is for the Authentication Server to use another telephone line and to call the one supposedly being used by the client. If it doesn't get a busy signal it knows that the client on the line is not at the correct number, regardless of what the Caller ID says.

d) Employ Public/Private Keys in Conjunction with Other Aspects of the Invention.

e) Time Sequencing Approach

Figure 15:
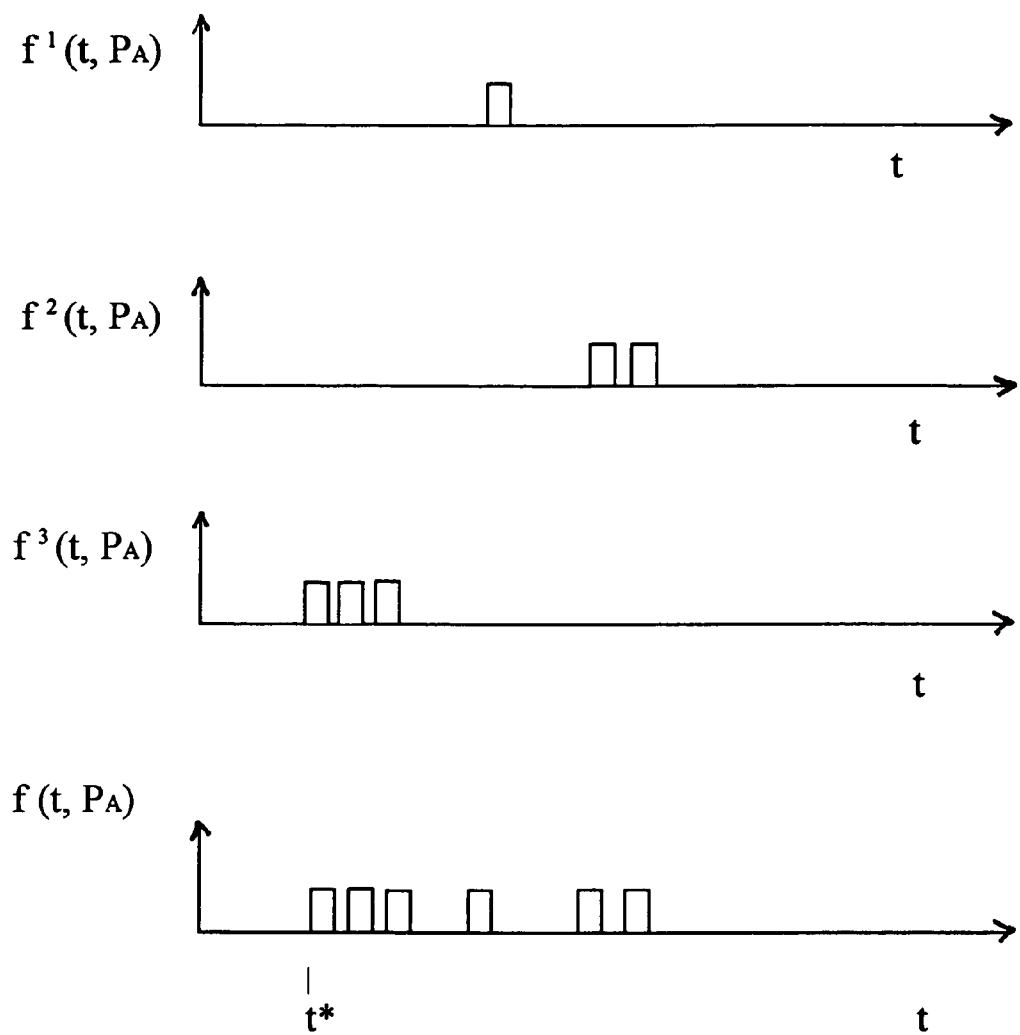
FIG. 15 is a graph showing how the command signal could be broken into three time-sequenced parts that superpose at the desired location $P_A$ to form an intelligible message.

Note that we have described one way to encrypt a message such that it is decrypted in-the-clear based on physical location. There are many others. For example, the digital signal in FIG. 10 could just be broken into three sequential parts without doing an eigenfunction decomposition. These would then be transmitted by the three satellites at staggered times such that only at the authorized client's site, PA, do they arrive in the correct arrangement to form the message. (See FIG. 15)

f) Leave All Clients on All the Time, but not Connected to the Network.

This could then be employed in the following way. When the spoof requests access to the network, a message is sent from the satellites to the authentic client's position. If the authentic client receives such a message when, in fact, the client didn't ask to go on-line, it could be programmed to transmit a signal back to the satellites telling them so, i.e., pointing out that the request for access was from a spoof Or, another method would be for the authentic users to be chirping (emitting random, but known, EM signals) all the time when not connected to the Network. These would be monitored from the satellites. If the authorized client keeps chirping after a request for access is received, the request is known to be from a spoof g) Use Lasers Instead of Radio Signals as a Means of Sending Messages to the Client.

This has the advantage of being easy to direct i.e. narrow beams. But it has the disadvantage of requiring the client's receiver to be in clear sight of the satellites.

h) Use Different Raw Data at Different Times to Determine Access.

Spoof doesn't know what to mimic. And if he tries to mimic them all the Authentication System could detect the bogus and unasked for signals, and deny access.

i) Ground Based Equivalent

Earth Bound Towers (such as microwave antenna towers) could be erected that serve the same purpose as the satellites. These would contain equivalent empirical data gathering devices as the satellites. But they would have the flexibility of having ground connections to the Authentication Server if desired.

j) Vector Decomposition Encryption Approach

This is another method to encrypt a message such that it is decrypted in-the-clear based on physical location. This method uses the vector nature of the EM field as a means of accomplishing the position dependent decryption. That is, when two or more electromagnetic fields reach a particular point they add together vectorally.

Consider the situation where the message we want to send to the client is a wave polarized along the x-axis. This wave could be of a certain duration in time. We can then design waves to be emitted from the three satellites that, when added together at $P_A$, give the desired result. These waves are individually not polarized along the x-axis. Let E represent the total electric field at $P_A$. Then, for example, we could have:

$E_1 = 4\hat{x} - \hat{y}$ here $\hat{x}$ and $\hat{y}$ are unit vectors along their $E_2 = -3\hat{x} + 3\hat{y}$ respective axes.

$E_3 = \hat{x} - 2\hat{y}$

This gives $E=E_1+E_2+E_3=2\hat{x}$ for the total electric field.

Since the actual signal could be embedded in noise, and since at the location $P_S$ the three signals will not arrive at a time that facilitates the above superposition, this is a viable method of encryption.

[Spatial encryption is partly based on retarded time emission of specific nature $t_{Ei}$. That is, we know that there is only one location on the surface of the earth where, if we emit at time $t_{Ei}$ then the three signals will arrive simultaneously.]

k) Applying the Inventive Concepts on Computer Network Security to the Wireless Computing Environment: Removing the Limitation of Fixed Position As has been described in the examples, the network security system is based on empirically gathering information about the physical location of a client/user and incorporating this into the authentication process. One particular embodiment employs mobile (cellular) phone technology in a computer that isn't mobile. [See (a) above.]

However, wireless (i.e., mobile) computing has recently been growing in popularity. In this situation, the computer is using the cellular phone system as the primary method of communicating with a network. There is no conventional wire connection to the network and there is no fixed location for the client.

The inventive concepts can easily be extended to a network security system that would encompass the use of wireless computers. Two methods will now be described.

[Note that there are several concepts (e.g., branded CPU, hidden information in ROM, clock synchronization, etc.) that obviously translate into the wireless environment.]

Continuous Monitoring

Just as in the earlier examples, this embodiment also requires that the client be initialized by a network representative. This could include any of the previously described things such as determining precise physical location of the client, clock synchronization, etc.

Then, in this embodiment, the authorized client is left on all the time and "chirping." That is, it is emitting a beacon signal at specific intervals even when not connected to the network. This allows the Network to continuously monitor the client's location. [In addition, the Network could keep a record of all these locations.]

Therefore, since the location is known at any given time, to within a certain range, all the security measures of the earlier examples can be employed to address authentication. This range is a region around the last known location. The size of this region is determined by the "chirp" rate and what velocity is physically possible for the client. If a signal is received that is outside this region, the client is denied access.

A variation of this would be that the client is kept within a relatively small cell size and there is no chirping. However, if the user decides that he wants to move outside the cell he informs the Network, through his software, that he is now in the "mobile" mode and the chirping begins.

Cell Size Is Increased

Even though wireless computers are mobile, they tend to be used within a limited geographical region. Therefore, starting at the initialization point the user can, through the software loaded on the client, inform the network that it intends to be in a certain region. An example would be a city. The authentication process works as it did in the earlier examples, except that now the cell encompasses the city not just a small region around a desk. The system is effective because it still can be used to address all those spoofs who are outside the cell. [In this embodiment, the client does not have to be chirping all the time.]

Other variations of these methods could be employed. For example:

Equipping the wireless computer with a means to connect to a standard telephone line.

If the client/user has moved outside the allowed cell in an unauthorized fashion, he can be required to go to a location where he can be uniquely identified by the Network.

Appendix A

Raising the Hurdle to Unauthorized Access

One of the goals is to raise the security hurdle to unauthorized access. This is done because the hacker/spoof looks at a given network and weighs "cost of overcoming security hurdle" against "possible reward."

The authentication system raises the hurdle by using empirically gathered client information and doesn't rely solely on client generated digital information for authentication. This then changes the dynamics of the Hacker/Authentication Server battle and raises the hurdle in three ways:

1. The technology needed to spoof the system is not readily available
2. The skills needed to use the technology aren't within the normal knowledge domain of the traditional hacker.
3. The technology needed is very expensive.

That is, the Authentication System forces the hacker to do things (e.g., satellite positioning, radio transmissions, etc.) that are not just based on clever uses of software. These are things that the vast majority of hackers have no experience with. Therefore, the system, although not perfect, is effective in dealing with the normal, or even the clever, hacker. And, consequently, the authentication system could be used to protect standard business computer networks.

As we have seen, it is possible to spoof the authentication system. But with each counter measure comes ever increasing technological sophistication and expense on the part of the spoof.

In essence, the authentication system makes breaking into a network very expensive and technologically challenging.

Therefore, one example of how it could be fruitfully employed is that a company could be set up to provide authentication services to many private business with computer networks to protect. Even if no single one of them could afford to set up the authentication system, as a group they would constitute the customer base that would make the system a viable business. Similarly, no traditional hacker could afford to overcome the hurdles set up by the system. And if a Counter-Authentication group were established to break through the barriers, the only way it could be done would be by the expenditure of a great amount of money and effort. It would be hard to keep this secret. Especially if Counter-Authenticaion group went about trying to get customers.

Therefore the system, although not perfect, is effective in dealing with the normal, or even the clever, hacker. And it is hackers who are the major problem for the standard business network. Consequently, the invention could be used to protect standard business computer networks. The hackers of these systems do not have the resources to overcome the hurdles the invention puts up.

Therefore a commercially viable business based on the invention could be set up where the business runs security for many companies at once.

Appendix B

An Example of The Invention's Authentication Process That Includes One Counter-Measure to Spoofing 1) The user uses his client computer $C_A$ (104), and its software, to request access to the Network (200). This client, which is configured by the Network, has very specific hardware and software pre-loaded on it related to the Authentication Process.
2) When the client's Network software is opened, it prompts the user to enter his User Credentials into a certain location on a "Network LogOn" screen. This could include, for example, his user ID and access code: (123, XYZ). It could also contain, for example, biometric information, Processor Serial Number, encryption keys (public/private), etc.
3) The client's software translates the credentials into digital information.
4) Data is Transmitted to the Authentication Server; Empirical Data is Obtained
   a) The client's software then creates an electronic message that includes the digitized credentials.

---
Diagram 3

| | 1 | 2 | 3 | X | Y | Z | | | |
---

When the "Connect" button on the Graphic User Interface (GUI) screen is clicked, the software forces two events to occur:
   i) the above electronic message is transmitted to the Authentication Server via the normal communications link (505)
   ii) the software orders the radio transmitter $R_A$ (105) to emit a beacon signal (700) from the antenna $T_A$ (106) with the pulse signature that has been assigned to this particular client.
   b) Empirical Data on Client's Physical Location is Obtained
   The act of transmitting the credentials to the network triggers a radio beacon signal to be emitted from the client. (The user doesn't have to do anything additional to have this beacon emitted.) This beacon signal is typically a spherical (i.e., omnidirectional) EM wave with a unique pulse shape.
   The radio signal is detected by the satellites $E_i$ (600). The satellites note the client's signature pulse and the time of reception, $t_{A1}$, $t_{A2}$, and $t_{A3}$ of the pulse. The arrival times will, in general be different for the three different satellites. (See FIG. 5) The results of these measurements are transmitted to the Authentication Server. [Note that in other embodiments there will be other quantities measured, such as: direction of the EM beam, polarization, etc.]
   Note the following features of the sequence:
      i. the authentication data is different from the prior art.
      ii. the method for obtaining that data is active (empirical) rather then passive.
5) Checking for Authenticity: A Two Step Process
   a) The Authentication Server has in its database a list of digitized credentials for all authorized users. When the electronic message from the client arrives via the normal communications link (505), the Authentication Server takes the user's digitized credentials and compares these to the credentials it has stored in its database for this particular user.
   b) Using Empirical Position Data To Determine Authenticity
      i) The Authentication Server also has in its database the physical location of each authorized client. (This can be obtained, for example, in an unequivocal manner by having a Network Official use a Global Positioning System (GPS) device during the initialization process. Once this physical position is established, movement of the user's client is restricted to a certain physical region established by the Network.)
      ii) The Authentication Server receives information from the satellites on their direct measurement of the clients beacon signal.
      iii) The Authentication Server uses beacon signal information to calculate the location of the client.
      iv) It then compares the actual position against the registered one.
   c) Both the User Credentials in (a) and the physical location in (b) must match the information stored in the Authentication Server's database for access to be given. If either, or both, of these quantities do not match those in the database, then access is denied.
6. The Authentication Server orders the satellites to transmit $f^1$, $f^2$, and $f^3$ at times $t_{E1}$, $t_{E2}$, and $t_{E3}$ respectively.
7. Satellites receive the order and comply. (See FIG. 13)
8. At the location $P_A$, the three signals arrive at time t* and superimpose to form the complete command signal $f(t, P_A)$. The Authentication Server knows this time t*. The command $f(t, P_A)$ is in-the-clear. That is, no analysis needs to be done to decipher it.
9. If the requesting client's antenna is at $P_A$ it reads this command.
10. The command orders the client to perform a task that is verifiable by the network. For example, it orders the client to transmit a particular message via the already existing communications channel (505) to the Authentication Server.
11. The Authentication Server waits to verify the response from the client. It also notes the nature of the response and the time at which the response comes in.
12. In its database the Network has the response time of the client $C_A$. This was empirically determined at the time of the initial setup of the client and the user.
13. If there is no response within the specified time, access is denied.

Appendix C
A Statement about Eigenfunctions
A particular example of a complete set of eigenfunction would be that of plane waves. (See John David Jackson, "Classical Electrodynamics", Second Edition, page 270.) These waves are, for example, functions of the argument $$Kx - \omega t$$

Here I have used the notation of Jackson with:
   K=the wave vector
   x=position in three dimensional space (a vector quantity)
   ω=frequency
   t=time
This set of functions is only given as an example. There are many others. Which set is chosen is determined by, among other factors, the nature of the message that is being sent, i.e., $f(t, P_A)$.

Appendix D
A Comment about Signal Analysis
We have used phrases such as "each of the partial summations, $f_i$, alone conveys no meaning relative to the full message f" and "any one of the partial sums $f_i$, by itself, will be unintelligible." These and other similar terms can be quantified using Signal Processing techniques such as autocorrelation, cross correlation, etc. [See A. Papoulis, "Signal Analysis"] These techniques give a quantitative way of measuring the relationship of one signal to another.

For example, the cross correlation function is a measure of how much one signal is like another. That is, how much information contained in one signal can be said to also be in another signal. Saying that a "partial summation, $f_i$, alone conveys no meaning relative to the full message f" is basically saying that the cross correlation between the two is very low.

The idea is to set up the partial sums such that the cross correlation is sufficiently low that it would not be easy for a spoof to discern what the full signal was.

Finally, it must be remembered that the spoof is dealing with the three signals after they have propagated from the transmitters to his antenna. That is, he receives signals that are distorted by noise.

Appendix E

Decryption Based on Physical Property of the Recipient (Note that this concept can be used for many other things besides computer network security.)

In this approach to encryption/decryption there are basically three levels.

1. The concept of encoding a message based on some inherent physical property of the recipient.
2. The particular physical quantity used
3. The particular method used with the chosen property to encode the information.

Information can be encrypted in a special way, such that, a specific, and unique, physical property of the recipient automatically decrypts the information. There are many physical properties this could be based on.

a. physical location
   b. unique sensitivity to light or sound
   c. DNA (unique to each individual)

For each unique physical property, there will be many ways to encrypt the information such that when it arrives it is automatically decoded by the physical property itself of the authentic recipient.

The main body of the disclosure has gone into details on using physical location to decrypt a message. The following are two additional examples to illustrate the general principles of encoding a message based on some inherent physical property of the recipient such that when it is received it is automatically decoded by the physical property itself of the intended recipient.

Note that the technique can be applied in a variety of areas, computer network security is but one of them.

DNA Decoding

DNA is a chemical. Each person's DNA is different. Therefore, this chemical is different for each person.

Imagine a situation where a message is sent to a recipient in the form of a card. The material used to print the message on the card is made of two chemicals. One of these chemicals is tailored to react to the recipient's DNA and the other does not react with it. To the naked eye the card appears to be blank. The message, as originally sent, is encrypted using the two chemicals and cannot be decrypted by normal cryptography. (For example, the message could appear as just a black area across the card made up of the two chemicals.) But when the legitimate recipient's DNA is smeared across the black area, a chemical reaction takes place that automatically deciphers the message. This could be accomplished using, for example, the recipient's blood or saliva.

This gives but one example of how the differences between each person's DNA could be used to decode messages. There are others. For example, light passing through a suspension of the DNA would be affected differently by different DNA.

Physical Senses Decoding of Messages

The sensitivity of our physical senses (sight, hearing, smell, touch, taste) varies from person to person. This sensitivity could be used to decipher messages.

PC's have the ability to produce over 1 million different colors. At any given color, there are many colors near it in wavelength that cannot be discerned by the average person. But there are some people who have such sensitive sight that they can distinguish two particular colors that only a very few others could. This sensitivity could be used to encrypt messages to that person.

Consider a situation where it is know that the legitimate recipient can discern two colors with wavelengths $\lambda_1$ and $\lambda_2$. In addition, these wavelengths are not discernible to the average person. A message can be encrypted by using the colors of the PC to first create a background in the color $\lambda_1$ and then writing the text of the message in color $\lambda_2$ on a computer monitor. The person with average sensitivity would not be able to discern the message. While the person with the heighten sensitivity would see the message, i.e., the message would come in the clear.

There are many other ways that the variations in sense sensitivity could be exploited both in:
   what sense is used
   how it is used
   for what purpose it is use.

Appendix F

Non-Computer Security Uses for the Invention

Teenager Positioning System TPS

Consider a situation where teenagers are required to wear an Authentication System "Beacon Beeper." The Beeper automatically sends out a radio beacon signal at preset intervals. The Authentication System signal detection system (satellites, microwave antennas, or some other method) detects these signals. The raw data is sent to a central processor (the equivalent of the authentication server) where it is analyzed to calculate the actual position. This information is then stored. Parents could then get this stored information in a variety of ways such as:

1. by access to a secured web page
2. by having the information emailed to them

Thus, parents could unobtrusively know where their kids are.

In addition, the system could be programmed to do the following:

a) Take a reading every five minutes and then, on request of the parent, print out a map of where the teenager had been over a specified time period. (This is a solution to the old response of "No where." which is commonly given by kids when asked where they were the night before.)
b) Restrict the teenager from going to certain geographic places. (Beeper gives a shock)
c) System detects if the kid is moving faster than walking, e.g., in a car. It can then change its sampling frequency to accurately determine the speed the kid is going at and record this.
d) Location is coordinated with roads and their speed limits
e) If the speed is in excess of the limit for that road, a note is made of it, the parent is alerted either through a phone call, email, or on a computer screen to a secured web page, and the police are alerted.
f) Parents can map out certain physical locations that
   the kid must stay in, and/or
   the kid can't go to (e.g. a person's house)
The parent is alerted if these are violated.
g) Two set of parents can coordinate their efforts. Both their kids can be equipped with Beepers. The system could then be programmed to coordinate their movements: either to alert if they get together or if they get apart. This could be used for keeping girls and boys apart for example.

h) Shock is delivered

This happens if the kid is doing something that the system has been programmed not to allow the kid to do. These could include such things as driving to fast, position where the kid isn't supposed to go, etc.

A system similar to this could be used to track toddlers. Parents could know at any moment where they were in the house.

Of course, there is the obvious use for criminal location.

This system could also be used to locate people with health related problems. For example, there are those who could become incapacitated. The location system could be tied to other measures that would transmit a signal to authorities under certain conditions (e.g., when pulse rate falls below a certain level, no motion is detected, etc.)

Note also that the Beeper could be more elaborate. It could be an electronic beacon electronically connected to a GPS hand held device. In this case the beacon is really sending out a message stating the teenager's position. (Note that in this case we are really not that worried about spoofing with anything sophisticated.) And the full authentication system would not be needed.

Appendix G

TPS Teenager Positioning System:

Simplified Method Based On A Modification to current Cellular Systems

A cellular phone system has data on the position of an active user. (This position is to within a certain resolution that may vary from one system to another.) That is, the system itself has this information currently. It is how the system knows when to "hand off" a user as he drives from one cell to another.

The cellular phone system could be modified by adding special software to transmit the position location of a user to an authorized person or web site.

The invention would work in the following way. A parent gives a cell phone to his kid who is going out for the evening. Whenever the parent wants, he calls the cell phone. The kid answers and the cellular phone system automatically locates the kid. Using its modified software, the system then transmits this information to the parent. There are many ways to do this: 1. through a secured web page. 2. directly on one of the new phone computer devices such as those that are allowing users to get email such as a Palm Pilot III, 3. email, etc.

In addition, variations of the standard cell phone could be developed. For example, something similar to the Authentication System Beeper, but instead of sending out a continuous radio beacon to satellites, it could be programmed to dial a particular telephone number automatically every five minutes. The location data would be recorded in a fashion similar to that described in Appendix F.

Appendix H

Location within A Geographically Limited Area

There are a host of situations (Homes, prisons, shopping malls, etc.) where an authority would like to know the physical location of a person (or an object) at any given moment. For example, a mother with several small children has to spend an inordinate amount of time making sure she knows where each one is. Also, parents going to shopping malls with the kids who are old enough to be on their own find themselves in the position of wondering where their kids went and how to make contact. Variations on the Authentication System could be employed to solve these problems.

There are several ways to accomplish this.
1. Beeper with Authentication System
2. Beeper with detection infrastructure specific to the geographical location
3. GPS Receiver connected to a local computer 1. Beeper with Authentication System:

As an example, the system could work in the following way: A mother puts a beeper on the wrist of each child. Then at strategic locations around the house she has a PC monitor on and connected to a secure web page. The page displays a map of her home. On the map is the location of the child. This could be updated as often as desired by the parent. The basic technology is the same as that discussed in Appendix F.

2. Beeper with Detection Infrastructure Specific to the Geographical Location

In this case, instead of using satellites or cellular phone technology to empirically measure the position of a child within a home, the system has its own detection infrastructure within the home and surrounding area. This could be based on extremely low level microwave, radio or other emissions from a beeper. This system is connected directly to a home PC. The PC calculates the location of each child and displays in on a map. Also the PC could be programmed to alert the parent if one of the children is going into restricted areas.

3. GPS Receiver Connected to a Local Computer

In this situation, the beeper isn't just a beacon. Instead it is connected to a GPS device. Upon entering a Shopping Mall, a mother goes to an area that has Location Beepers for lease. She is given one for each child and an ID number. The device is programmed to respond to a command from the central authority. For example, a mother wants to know where in a Shopping Mall her kids are. She goes to a computer (several of which are conveniently located around the Mall) and punches in her ID number. The computer sends out a wireless signal to the GPS devices to determine their location and to send that information back to the computer. The computer then displays the information for the parent.

Another variation on this would be for a parent who is dropping his kid off at the Mall. When the parent returns he could be given a map of where the kid has been.

The invention claimed is:

1. A method comprising:
iteratively receiving, via an intermediary network, information comprising a physical location of a particular object, of a plurality of objects, and a time that the particular object was at its corresponding physical location;
wherein each object, of the plurality of objects, is configured to transmit electromagnetic signals having one of a plurality of signatures and wherein each of the signatures is associated with only one of the plurality of objects; and
wherein the physical location of the particular object for a particular time is calculated in response to receipt by a plurality of receiving stations of the intermediary network of the electromagnetic signal transmitted by the particular object for the particular time;
generating a history of the physical locations of the particular object; and
transmitting, via the intermediary network, a message receivable by the particular object,
wherein the message is determined by a physical location of the particular object and at least one of:
an identity of a user of the particular object; and
a characteristic of a user of the particular object.

2. The method of claim 1 also including triggering an alert if one of the locations of the particular object is different from an expected location of the object.

3. The method of claim 1 also including performing an authentication process in connection with the physical location of the particular object.

4. The method of claim 1, wherein generating a history of the physical locations of the particular object comprises generating a map of the physical locations of the particular object.

5. A computer system configured, through software, to execute a method for providing a location based service, the method comprising the steps of:
- iteratively receiving information comprising a physical location of a particular client device, of a plurality of client devices, and a time that the particular client device was at its corresponding physical location;
  - wherein each client device, of the plurality of client devices, is configured to transmit electromagnetic signals having one of a plurality of signatures wherein each of the signatures is associated with only one of the plurality of client devices;
  - wherein the information is received from a network;
  - wherein the network comprises a plurality of receiving stations configured to receive electromagnetic radiation signals having one of the plurality of signatures;
  - wherein the network receives, at multiple receiving stations, a reception of an electromagnetic radiation signal having one of the plurality of signatures, and wherein the network uses the receptions to calculate the physical location of the particular client device associated with that one of the plurality of signatures, and to assign a time that the particular client device was at that physical location;
- creating a history of the physical locations of the particular client device by storing the physical locations along with the time that the device was at each physical location;
- plotting the physical locations of the particular client device on a map;
- displaying the map, with the plotted physical locations of the particular client device, at a secured website; and
- transmitting, via the network, a message receivable by the particular client device,
  - wherein the message is determined by a physical location of the particular client device and at least one of:
    - an identity of a user of the particular client device; and
    - a characteristic of a user of the particular client device.

6. The computer system of claim 5, wherein the information received is at least partially derived from a global positioning system information device coupled to the particular client device.

7. The computer system of claim 5, wherein the method further comprises calculating the speed at which the particular client device is traveling.

8. The computer system of claim 5, wherein the method further comprises programming into the computer system at least one disallowed activity for the particular client device.

9. The computer system of claim 8, wherein the method further comprises detecting a disallowed activity, and generating a notification in response to detecting the disallowed activity.

10. The computer system of claim 9, wherein the method further comprises transmitting the notification to law enforcement authorities.

11. The computer system of claim 5, wherein the method further comprises generating an alert message if at least one of the physical locations of the particular client device is outside a predetermined geographical area.

12. The computer system of claim 11, wherein generating the alert message comprises generating at least one of an email, a phone call, or a position indication on a map at a web site.

13. The computer system of claim 5, wherein the particular device is a cell phone.

14. The computer system of claim 5, wherein the method further comprises performing an authentication process in connection with the physical location of the particular client device.

15. A computer system configured, through software, to execute a method for providing a location based service, the method comprising the steps of:
- iteratively receiving information comprising a physical location of a particular client device, of a plurality of client devices, and a time that the particular client device was at its corresponding physical location;
  - wherein each client device, of the plurality of client devices, is configured to transmit electromagnetic signals having one of a plurality of signatures wherein each of the signatures is associated with only one of the plurality of client devices;
  - wherein the information is received from a network;
  - wherein the network comprises a plurality of receiving stations configured to receive electromagnetic radiation signals having one of the plurality of signatures;
  - wherein the network receives, at multiple receiving stations, a reception of an electromagnetic radiation signal having one of the plurality of signatures, and wherein the network uses the receptions to calculate the physical location of the particular client device associated with that one of the plurality of signatures, and to assign a time that the particular client device was at that physical location;
- creating a history of the physical locations of the particular client device by storing the physical locations along with the time that the particular client device was at each physical location, and
- programming the computer system with at least one disallowed activity for the particular client device; and
- transmitting, via the network, a message receivable by the device,
  - wherein the message is determined by a physical location of the device and at least one of:
    - an identity of a user of the device; and
    - a characteristic of a user of the device.

16. The computer system of claim 15, wherein the method further comprises detecting a disallowed activity, and generating a notification.

17. The computer system of claim 16, wherein the method further comprises transmitting the notification to law enforcement authorities.

18. The computer system of claim 15, wherein the method further comprises plotting the physical locations of the device on a map.

19. The computer system of claim 18, wherein the method further comprises displaying the map, with the plotted physical locations of the particular client device, at a secured website.

20. The computer system of claim 15, wherein the information received is at least partially derived from a global positioning system information device coupled to the particular client device.

21. The computer system of claim 15, wherein the method further comprises calculating the speed at which the particular client device is traveling.

22. The computer system of claim 15, wherein the method further comprises generating an alert message if at least one of the physical locations of the particular client device is outside a predetermined geographical area.

23. The computer system of claim 22, wherein the alert message is at least one of an email, a phone call, or a position on a map at a web site.

24. The computer system of claim 15, wherein the particular client device is a cell phone.

25. The computer system of claim 15, wherein the method further comprises performing an authentication process in connection with the physical location of the particular client device.

26. A system, comprising:
at least one processor configured by software to:
receive information comprising a physical location of a particular client device, of a plurality of client devices, and a time that the particular client device was at its corresponding physical location;
wherein each client device, of the plurality of client devices, is configured to transmit electromagnetic signals having one of a plurality of signatures wherein each of the signatures is associated with only one of the plurality of client devices;
wherein the information is received from a network;
wherein the network comprises a plurality of receiving stations configured to receive electromagnetic radiation signals having one of the plurality of signatures;
wherein the network receives, at multiple receiving stations, a reception of an electromagnetic radiation signal having one of the plurality of signatures, and wherein the network uses the receptions to calculate the physical location of the particular client device associated with that one of the plurality of signatures, and to assign a time that the particular client device was at that physical location; and
transmit, via the network, a message receivable by the particular client device,
wherein the message is determined by a physical location of the particular client device and at least one of:
an identity of a user of the particular client device; and
a characteristic of a user of the particular client device.

27. The system of claim 26, wherein the information received is at least partially derived from a global positioning system information device coupled to the particular client device.

28. The system of claim 26, wherein the at least one processor is further configured to calculate the speed at which the particular client device is traveling.

29. The system of claim 26, wherein the at least one processor is further configured to program the system with at least one disallowed activity for the particular client device.

30. The system of claim 29, wherein the at least one processor is further configured to generate a notification upon detecting a disallowed activity.

31. The system of claim 30, wherein the at least one processor is further configured to transmit the notification to law enforcement authorities.

32. The system of claim 26, wherein the at least one processor is further configured to iteratively receive information comprising a physical location of the particular client device and a time that the particular client device was at its corresponding physical location and to generate an alert message if at least one of the physical locations of the particular client device is outside a predetermined geographical area.

33. The system of claim 32, wherein the alert message is at least one of an email, a phone call, or a position on a map at a web site.

34. The system of claim 26, wherein the particular client device is a cell phone.

35. The system of claim 26, wherein the at least one processor is further configured to perform an authentication process in connection with the physical location of the particular client device.

36. The system of claim 26, wherein the at least one processor is further configured to:
plot the physical locations of the particular client device on a map; and
display the map, with the plotted physical locations of the particular client device, at a secured website.

37. A system, comprising:
at least one processor configured by software to:
receive information comprising a physical location of a particular client device, of a plurality of client devices, and a time that the particular client device was at its corresponding physical location;
wherein each client device, of the plurality of client devices, is configured to transmit electromagnetic signals having one of a plurality of signatures wherein each of the signatures is associated with only one of the plurality of client devices;
wherein the information is received from a network;
wherein the network comprises a plurality of receiving stations configured to receive electromagnetic radiation signals having one of the plurality of signatures;
wherein the network receives, at multiple receiving stations, a reception of an electromagnetic radiation signal having one of the plurality of signatures, and wherein the network uses the receptions to calculate the physical location of the particular client device associated with that one of the plurality of signatures, and to assign a time that the particular client device was at that physical location;
identify disallowed activities for the particular client device; and
transmit, via the network, a message receivable by the particular client device,
wherein the message is determined by a physical location of the particular client device and at least one of:
an identified activity of the particular client device;
an identity of a user of the particular client device; and
a characteristic of a user of the particular client device.

38. The system of claim 37, wherein the at least one processor is further configured to generate a notification upon detecting a disallowed activity.

39. The system of claim 38, wherein the at least one processor is further configured to transmit the notification to law enforcement authorities.

40. The system of claim 37, wherein the at least one processor is further configured to iteratively receive information comprising a physical location of the particular client device and a time that the particular client device was at its corresponding physical location and to plot the physical locations of the particular client device on a map.

41. The system of claim 40, wherein the at least one processor is further configured to display the map, with the plotted physical locations of the particular client device, at a secured website.

42. The system of claim 37, wherein the information received is at least partially derived from a global positioning system information device coupled to the particular client device.

43. The system of claim 37, wherein the at least one processor is further configured to calculate the speed at which the particular client device is traveling.

44. The system of claim 37, wherein the at least one processor is further configured to iteratively receive information comprising a physical location of the particular client device and a time that the particular client device was at its corresponding physical location and to generate an alert message if at least one of the physical locations of the particular client device is outside a predetermined geographical area.

45. The system of claim 44, wherein the alert message is at least one of an email, a phone call, or a position on a map at a web site.

46. The system of claim 37, wherein the particular client device is a cell phone.

47. The system of claim 37, wherein the at least one processor is further configured to perform an authentication process in connection with the physical location of the particular client device.

* * * * *